(12) United States Patent
McAlister

(10) Patent No.: US 8,225,768 B2
(45) Date of Patent: Jul. 24, 2012

(54) INTEGRATED FUEL INJECTOR IGNITERS SUITABLE FOR LARGE ENGINE APPLICATIONS AND ASSOCIATED METHODS OF USE AND MANUFACTURE

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 12/913,744

(22) Filed: Oct. 27, 2010

(65) Prior Publication Data

US 2011/0233308 A1 Sep. 29, 2011

Related U.S. Application Data

(60) Continuation-in-part of application No. 12/841,170, filed on Jul. 21, 2010, and a continuation-in-part of application No. 12/841,146, filed on Jul. 21, 2010, and a continuation-in-part of application No. 12/841,149, filed on Jul. 21, 2010, and a continuation-in-part of (Continued)

(51) Int. Cl.
    *F02M 57/06* (2006.01)
(52) U.S. Cl. .................................................. 123/297
(58) Field of Classification Search .................. 123/297
    See application file for complete search history.

(56) References Cited

U.S. PATENT DOCUMENTS 1,451,384 A  4/1923 Whyte 2,441,277 A  5/1948 Lamphere (Continued)

FOREIGN PATENT DOCUMENTS

DE       3443022 A1    5/1986

(Continued)

OTHER PUBLICATIONS

International Search Report and Written Opinion for Application No. PCT/US2011/024778 Applicant: McAlister Technologies, LLC.; Date of Mailing: Sep. 27, 2011 (10 pages).

(Continued)

*Primary Examiner* — Erick Solis
(74) *Attorney, Agent, or Firm* — Perkins Coie LLP

(57) ABSTRACT

Embodiments of injectors suitable for injection ports having relatively small diameters are disclosed herein. An injector according to one embodiment includes a body having a first end portion opposite a second end portion. The second end portion is configured to be positioned adjacent to a combustion chamber and the first end portion is configured to be spaced apart from the combustion chamber. The injector also includes an ignition conductor extending through the body from the first end portion to the second end portion, and an insulator extending longitudinally along the ignition conductor and surrounding at least a portion of the ignition conductor. The injector further includes a valve extending longitudinally along the insulator from the first end portion to the second end portion. The valve includes a sealing end portion, and the valve is movable along the insulator between an open position and a closed position. The injector also includes a valve seat at or proximate to the second end portion of the body. When the valve is in the open position the sealing end portion is spaced apart from the valve seat, and when the valve is in the closed position the sealing end portion contacts at least a portion of the valve seat.

36 Claims, 8 Drawing Sheets

Related U.S. Application Data application No. 12/841,135, filed on Jul. 21, 2010, now Pat. No. 8,192,852, and a continuation-in-part of application No. 12/804,509, filed on Jul. 21, 2010, and a continuation-in-part of application No. 12/804,508, filed on Jul. 21, 2010, said application No. 12/841,170 is a continuation-in-part of application No. 12/581,825, filed on Oct. 19, 2009, which is a division of application No. 12/006,774, filed on Jan. 7, 2008, now Pat. No. 7,628,137, said application No. 12/841,170 is a continuation-in-part of application No. PCT/US2009/067044, filed on Dec. 7, 2009, and a continuation-in-part of application No. 12/653,085, filed on Dec. 7, 2009, which is a continuation-in-part of application No. 12/006,774, filed on Jan. 7, 2008, now Pat. No. 7,628,167, said application No. 12/841,146 is a continuation-in-part of application No. 12/581,825, filed on Oct. 19, 2009, and a continuation-in-part of application No. 12/653,085, filed on Dec. 7, 2009, said application No. 12/804,508 is a continuation-in-part of application No. 12/581,825, filed on Oct. 19, 2009, and a continuation-in-part of application No. 12/653,085, filed on Dec. 7, 2009, application No. 12/913,744, which is a continuation-in-part of application No. 12/804,510, filed on Jul. 21, 2010, now Pat. No. 8,074,625, and a continuation-in-part of application No. 12/581,825, filed on Oct. 19, 2009, and a continuation-in-part of application No. 12/653,085, filed on Dec. 7, 2009, said application No. 12/841,149 is a continuation-in-part of application No. 12/581,825, filed on Oct. 19, 2009, said application No. 12/841,135 is a continuation-in-part of application No. 12/581,825, filed on Oct. 19, 2009, and a continuation-in-part of application No. 12/653,085, filed on Dec. 7, 2009, said application No. 12/804,509 is a continuation-in-part of application No. 12/581,825, filed on Oct. 19, 2009, and a continuation-in-part of application No. 12/653,085, filed on Dec. 7, 2009, said application No. 12/841,149 is a continuation-in-part of application No. 12/653,085, filed on Dec. 7, 2009.

(60) Provisional application No. 61/304,403, filed on Feb. 13, 2010, provisional application No. 61/312,100, filed on Mar. 9, 2010, provisional application No. 61/237,425, filed on Aug. 27, 2009, provisional application No. 61/237,466, filed on Aug. 27, 2009, provisional application No. 61/237,479, filed on Aug. 27, 2009.

U.S. PATENT DOCUMENTS

| Patent No. | | Date | Inventor |
|---|---|---|---|
| 2,721,100 | A | 10/1955 | Bodine, Jr. |
| 3,243,335 | A | 3/1966 | Faile |
| 3,520,961 | A | 7/1970 | Suda et al. |
| 3,594,877 | A | 7/1971 | Suda et al. |
| 3,608,050 | A | 9/1971 | Carman et al. |
| 3,689,293 | A | 9/1972 | Beall |
| 3,931,438 | A | 1/1976 | Beall et al. |
| 3,960,995 | A | 6/1976 | Kourkene |
| 3,976,039 | A | 8/1976 | Henault |
| 3,997,352 | A | 12/1976 | Beall |
| 4,020,803 | A | 5/1977 | Thuren et al. |
| 4,066,046 | A | 1/1978 | McAlister |
| 4,095,580 | A | 6/1978 | Murray et al. |
| 4,105,004 | A | 8/1978 | Asai et al. |
| 4,122,816 | A | 10/1978 | Fitzgerald et al. |
| 4,135,481 | A | 1/1979 | Resler, Jr. |
| 4,183,467 | A | 1/1980 | Sheraton et al. |
| 4,203,393 | A | 5/1980 | Giardini |
| 4,293,188 | A | 10/1981 | McMahon |
| 4,330,732 | A | 5/1982 | Lowther |
| 4,377,455 | A | 3/1983 | Kadija et al. |
| 4,448,160 | A | 5/1984 | Vosper |
| 4,469,160 | A | 9/1984 | Giamei |
| 4,483,485 | A | 11/1984 | Kamiya et al. |
| 4,511,612 | A | 4/1985 | Huther et al. |
| 4,528,270 | A | 7/1985 | Matsunaga |
| 4,536,452 | A | 8/1985 | Stempin et al. |
| 4,567,857 | A | 2/1986 | Houseman et al. |
| 4,574,037 | A | 3/1986 | Samejima et al. |
| 4,677,960 | A | 7/1987 | Ward |
| 4,684,211 | A | 8/1987 | Weber et al. |
| 4,688,538 | A | 8/1987 | Ward et al. |
| 4,733,646 | A | 3/1988 | Iwasaki |
| 4,742,265 | A | 5/1988 | Giachino et al. |
| 4,760,818 | A | 8/1988 | Brooks et al. |
| 4,760,820 | A | 8/1988 | Tozzi |
| 4,774,914 | A | 10/1988 | Ward |
| 4,774,919 | A | 10/1988 | Matsuo et al. |
| 4,777,925 | A | 10/1988 | Lasota |
| 4,841,925 | A | 6/1989 | Ward |
| 4,922,883 | A | 5/1990 | Iwasaki |
| 4,932,263 | A | 6/1990 | Wlodarczyk |
| 4,977,873 | A | 12/1990 | Cherry et al. |
| 4,982,708 | A | 1/1991 | Stutzenberger |
| 5,034,852 | A | 7/1991 | Rosenberg |
| 5,035,360 | A | 7/1991 | Green et al. |
| 5,036,669 | A | 8/1991 | Earleson et al. |
| 5,055,435 | A | 10/1991 | Hamanaka et al. |
| 5,056,496 | A | 10/1991 | Morino et al. |
| 5,072,617 | A | 12/1991 | Weiss |
| 5,076,223 | A | 12/1991 | Harden et al. |
| 5,095,742 | A | 3/1992 | James et al. |
| 5,107,673 | A | 4/1992 | Sato et al. |
| 5,109,817 | A | 5/1992 | Cherry |
| 5,131,376 | A | 7/1992 | Ward et al. |
| 5,150,682 | A | 9/1992 | Magnet |
| 5,193,515 | A | 3/1993 | Oota et al. |
| 5,207,208 | A | 5/1993 | Ward |
| 5,211,142 | A | 5/1993 | Matthews et al. |
| 5,220,901 | A | 6/1993 | Morita et al. |
| 5,267,601 | A | 12/1993 | Dwivedi |
| 5,297,518 | A | 3/1994 | Cherry |
| 5,305,360 | A | 4/1994 | Remark et al. |
| 5,328,094 | A | 7/1994 | Goetzke et al. |
| 5,329,606 | A | 7/1994 | Andreassen |
| 5,343,699 | A | 9/1994 | McAlister |
| 5,377,633 | A | 1/1995 | Wakeman |
| 5,390,546 | A | 2/1995 | Wlodarczyk |
| 5,392,745 | A | 2/1995 | Beck |
| 5,394,852 | A | 3/1995 | McAlister |
| 5,421,195 | A | 6/1995 | Wlodarczyk |
| 5,421,299 | A | 6/1995 | Cherry |
| 5,435,286 | A | 7/1995 | Carroll, III et al. |
| 5,439,532 | A | 8/1995 | Fraas |
| 5,456,241 | A | 10/1995 | Ward |
| 5,475,772 | A | 12/1995 | Hung et al. |
| 5,517,961 | A | 5/1996 | Ward |
| 5,531,199 | A | 7/1996 | Bryant et al. |
| 5,549,746 | A | 8/1996 | Scott et al. |
| 5,584,490 | A | 12/1996 | Inoue et al. |
| 5,588,299 | A | 12/1996 | DeFreitas |
| 5,605,125 | A | 2/1997 | Yaoita |
| 5,607,106 | A | 3/1997 | Bentz et al. |
| 5,608,832 | A | 3/1997 | Pfandl et al. |
| 5,676,026 | A | 10/1997 | Tsuboi et al. |
| 5,699,253 | A | 12/1997 | Puskorius et al. |
| 5,702,761 | A | 12/1997 | DiChiara, Jr. et al. |
| 5,704,553 | A | 1/1998 | Wieczorek et al. |
| 5,714,680 | A | 2/1998 | Taylor et al. |
| 5,715,788 | A | 2/1998 | Tarr et al. |
| 5,738,818 | A | 4/1998 | Atmur et al. |
| 5,745,615 | A | 4/1998 | Atkins et al. |
| 5,746,171 | A | 5/1998 | Yaoita |
| 5,767,026 | A | 6/1998 | Kondoh et al. |
| 5,797,427 | A | 8/1998 | Buescher |

| | | | | | | |
|---|---|---|---|---|---|---|
| 5,806,581 A | 9/1998 | Haasch et al. | 6,898,355 B2 | 5/2005 | Johnson et al. | |
| 5,816,217 A | 10/1998 | Wong | 6,899,076 B2 | 5/2005 | Funaki et al. | |
| 5,853,175 A | 12/1998 | Udagawa | 6,904,893 B2 | 6/2005 | Hotta et al. | |
| 5,863,326 A | 1/1999 | Nause et al. | 6,912,998 B1 | 7/2005 | Rauznitz et al. | |
| 5,876,659 A | 3/1999 | Yasutomi et al. | 6,940,213 B1 | 9/2005 | Heinz et al. | |
| 5,915,272 A | 6/1999 | Foley et al. | 6,955,154 B1 | 10/2005 | Douglas | |
| 5,930,420 A | 7/1999 | Atkins et al. | 6,976,683 B2 | 12/2005 | Eckert et al. | |
| 5,941,207 A | 8/1999 | Anderson et al. | 6,984,305 B2 | 1/2006 | McAlister | |
| 5,947,091 A | 9/1999 | Krohn et al. | 6,994,073 B2 | 2/2006 | Tozzi et al. | |
| 6,015,065 A | 1/2000 | McAlister | 7,007,658 B1 | 3/2006 | Cherry et al. | |
| 6,017,390 A | 1/2000 | Charych et al. | 7,013,863 B2 | 3/2006 | Shiraishi et al. | |
| 6,026,568 A | 2/2000 | Atmur et al. | 7,025,358 B2 | 4/2006 | Ueta et al. | |
| 6,029,627 A | 2/2000 | Vandyne | 7,032,845 B2 | 4/2006 | Dantes et al. | |
| 6,042,028 A | 3/2000 | Xu | 7,070,126 B2 | 7/2006 | Shinogle | |
| 6,062,498 A | 5/2000 | Klopfer | 7,073,480 B2 | 7/2006 | Shiraishi et al. | |
| 6,085,990 A | 7/2000 | Augustin | 7,077,100 B2 * | 7/2006 | Vogel et al. | 123/297 |
| 6,092,501 A | 7/2000 | Matayoshi et al. | 7,077,108 B2 | 7/2006 | Fujita et al. | |
| 6,092,507 A | 7/2000 | Bauer et al. | 7,086,376 B2 | 8/2006 | McKay | |
| 6,093,338 A | 7/2000 | Tani et al. | 7,104,246 B1 | 9/2006 | Gagliano et al. | |
| 6,102,303 A | 8/2000 | Bright et al. | 7,104,250 B1 | 9/2006 | Yi et al. | |
| 6,131,607 A | 10/2000 | Cooke | 7,121,253 B2 | 10/2006 | Shiraishi et al. | |
| 6,138,639 A | 10/2000 | Hiraya et al. | 7,131,426 B2 | 11/2006 | Ichinose et al. | |
| 6,155,212 A | 12/2000 | McAlister | 7,138,046 B2 | 11/2006 | Roychowdhury | |
| 6,173,913 B1 | 1/2001 | Shafer et al. | 7,140,347 B2 | 11/2006 | Suzuki et al. | |
| 6,185,355 B1 | 2/2001 | Hung | 7,140,353 B1 | 11/2006 | Rauznitz et al. | |
| 6,189,522 B1 | 2/2001 | Moriya | 7,140,562 B2 | 11/2006 | Holzgrefe et al. | |
| 6,253,728 B1 | 7/2001 | Matayoshi et al. | 7,201,136 B2 | 4/2007 | McKay et al. | |
| 6,267,307 B1 | 7/2001 | Pontoppidan | 7,228,840 B2 | 6/2007 | Sukegawa et al. | |
| 6,281,976 B1 | 8/2001 | Taylor et al. | 7,249,578 B2 | 7/2007 | Fricke et al. | |
| 6,335,065 B1 | 1/2002 | Steinlage et al. | 7,255,290 B2 | 8/2007 | Bright et al. | |
| 6,340,015 B1 | 1/2002 | Benedikt et al. | 7,278,392 B2 | 10/2007 | Zillmer et al. | |
| 6,360,721 B1 | 3/2002 | Schuricht et al. | 7,305,971 B2 | 12/2007 | Fujii | |
| 6,378,485 B2 | 4/2002 | Elliott | 7,340,118 B2 | 3/2008 | Wlodarczyk et al. | |
| 6,386,178 B1 | 5/2002 | Rauch | 7,386,982 B2 | 6/2008 | Runkle et al. | |
| 6,446,597 B1 | 9/2002 | McAlister | 7,404,395 B2 | 7/2008 | Yoshimoto | |
| 6,455,173 B1 | 9/2002 | Marijnissen et al. | 7,418,940 B1 | 9/2008 | Yi et al. | |
| 6,478,007 B2 | 11/2002 | Miyashita et al. | 7,484,369 B2 | 2/2009 | Myhre | |
| 6,483,311 B1 | 11/2002 | Ketterer | 7,527,041 B2 | 5/2009 | Wing et al. | |
| 6,490,391 B1 | 12/2002 | Zhao et al. | 7,540,271 B2 | 6/2009 | Stewart et al. | |
| 6,501,875 B2 | 12/2002 | Zhao et al. | 7,554,250 B2 | 6/2009 | Kadotani et al. | |
| 6,503,584 B1 | 1/2003 | McAlister | 7,588,012 B2 | 9/2009 | Gibson et al. | |
| 6,506,336 B1 | 1/2003 | Beall et al. | 7,628,137 B1 | 12/2009 | McAlister | |
| 6,516,114 B2 | 2/2003 | Zhao et al. | 7,703,775 B2 | 4/2010 | Matsushita et al. | |
| 6,517,011 B1 | 2/2003 | Ayanji et al. | 7,707,832 B2 | 5/2010 | Commaret et al. | |
| 6,532,315 B1 | 3/2003 | Hung et al. | 7,880,193 B2 | 2/2011 | Lam | |
| 6,542,663 B1 | 4/2003 | Zhao et al. | 7,898,258 B2 | 3/2011 | Neuberth et al. | |
| 6,549,713 B1 | 4/2003 | Pi et al. | 7,918,212 B2 | 4/2011 | Verdejo et al. | |
| 6,556,746 B1 | 4/2003 | Zhao et al. | 7,938,102 B2 | 5/2011 | Sherry | |
| 6,561,168 B2 | 5/2003 | Hokao et al. | 7,942,136 B2 | 5/2011 | Lepsch et al. | |
| 6,567,599 B2 | 5/2003 | Hung | 2002/0017573 A1 | 2/2002 | Sturman | |
| 6,571,035 B1 | 5/2003 | Pi et al. | 2002/0084793 A1 | 7/2002 | Hung et al. | |
| 6,578,775 B2 | 6/2003 | Hokao | 2002/0131171 A1 | 9/2002 | Hung | |
| 6,583,901 B1 | 6/2003 | Hung | 2002/0131666 A1 | 9/2002 | Hung et al. | |
| 6,584,244 B2 | 6/2003 | Hung | 2002/0131673 A1 | 9/2002 | Hung | |
| 6,585,171 B1 | 7/2003 | Boecking | 2002/0131674 A1 | 9/2002 | Hung | |
| 6,587,239 B1 | 7/2003 | Hung | 2002/0131686 A1 | 9/2002 | Hung | |
| 6,615,810 B2 | 9/2003 | Funk et al. | 2002/0131706 A1 | 9/2002 | Hung | |
| 6,615,899 B1 | 9/2003 | Woodward et al. | 2002/0131756 A1 | 9/2002 | Hung | |
| 6,621,964 B2 | 9/2003 | Quinn et al. | 2002/0141692 A1 | 10/2002 | Hung | |
| 6,663,027 B2 | 12/2003 | Jameson et al. | 2002/0150375 A1 | 10/2002 | Hung et al. | |
| 6,672,277 B2 | 1/2004 | Yasuoka et al. | 2002/0151113 A1 | 10/2002 | Hung et al. | |
| 6,700,306 B2 | 3/2004 | Nakamura et al. | 2002/0166536 A1 | 11/2002 | Hitomi et al. | |
| 6,705,274 B2 | 3/2004 | Kubo | 2003/0012985 A1 | 1/2003 | McAlister | |
| 6,719,224 B2 | 4/2004 | Enomoto et al. | 2004/0008989 A1 | 1/2004 | Hung | |
| 6,722,339 B2 | 4/2004 | Elliott | 2004/0256495 A1 | 12/2004 | Baker | |
| 6,722,340 B1 | 4/2004 | Sukegawa et al. | 2005/0045146 A1 | 3/2005 | McKay et al. | |
| 6,722,840 B2 | 4/2004 | Fujisawa et al. | 2005/0098663 A1 | 5/2005 | Ishii | |
| 6,725,826 B2 | 4/2004 | Esteghlal | 2005/0257776 A1 | 11/2005 | Bonutti | |
| 6,755,175 B1 * | 6/2004 | McKay et al. ............ 123/297 | 2006/0016916 A1 | 1/2006 | Petrone et al. | |
| 6,756,140 B1 | 6/2004 | McAlister | 2006/0102140 A1 | 5/2006 | Sukegawa et al. | |
| 6,763,811 B1 | 7/2004 | Tamol, Sr. | 2006/0108452 A1 | 5/2006 | Anzinger et al. | |
| 6,796,516 B2 | 9/2004 | Maier et al. | 2006/0169244 A1 | 8/2006 | Allen | |
| 6,799,513 B2 | 10/2004 | Schafer | 2007/0142204 A1 | 6/2007 | Park et al. | |
| 6,811,103 B2 | 11/2004 | Gurich et al. | 2007/0189114 A1 | 8/2007 | Reiner et al. | |
| 6,814,313 B2 | 11/2004 | Petrone et al. | 2007/0283927 A1 | 12/2007 | Fukumoto et al. | |
| 6,845,920 B2 | 1/2005 | Sato et al. | 2008/0072871 A1 | 3/2008 | Vogel et al. | |
| 6,851,413 B1 | 2/2005 | Tamol, Sr. | 2008/0081120 A1 | 4/2008 | Van Ooij et al. | |
| 6,854,438 B2 | 2/2005 | Hilger et al. | 2008/0098984 A1 | 5/2008 | Sakamaki | |
| 6,871,630 B2 * | 3/2005 | Herden et al. ............ 123/297 | 2008/0103672 A1 | 5/2008 | Ueda et al. | |

| | | | |
|---|---|---|---|
| 2009/0078798 | A1 | 3/2009 | Gruendl et al. |
| 2009/0093951 | A1 | 4/2009 | McKay et al. |
| 2009/0204306 | A1 | 8/2009 | Goeke et al. |
| 2009/0264574 | A1 | 10/2009 | Van Ooij et al. |
| 2010/0020518 | A1 | 1/2010 | Bustamante |
| 2010/0043758 | A1 | 2/2010 | Caley |
| 2010/0108023 | A1 | 5/2010 | McAlister |
| 2010/0183993 | A1 | 7/2010 | McAlister |
| 2011/0036309 | A1 | 2/2011 | McAlister |
| 2011/0042476 | A1 | 2/2011 | McAlister |
| 2011/0048371 | A1 | 3/2011 | McAlister |
| 2011/0048374 | A1 | 3/2011 | McAlister |
| 2011/0048381 | A1 | 3/2011 | McAlister |
| 2011/0056458 | A1 | 3/2011 | McAlister |
| 2011/0057058 | A1 | 3/2011 | McAlister |
| 2011/0134049 | A1 | 6/2011 | Lin et al. |
| 2011/0146619 | A1 | 6/2011 | McAlister |
| 2011/0210182 | A1 | 9/2011 | McAlister |

FOREIGN PATENT DOCUMENTS

| | | |
|---|---|---|
| EP | 392594 | 10/1990 |
| EP | 671555 | 9/1995 |
| EP | 1972606 A1 | 9/2008 |
| GB | 1038490 A | 8/1966 |
| JP | 61-023852 | 2/1986 |
| JP | 02-259268 | 10/1990 |
| JP | 08-049623 | 2/1996 |
| JP | 2008-334077 | 12/1996 |
| JP | 2004-324613 A | 11/2004 |
| KR | 2007-0026296 A | 3/2007 |
| KR | 2008-0073635 A | 8/2008 |
| WO | WO-2008-017576 | 2/2008 |

OTHER PUBLICATIONS

Non-Final Office Action for U.S. Appl. No. 12/961,461; Applicant: McAlister et al.; Date of Mailing: Jan. 17, 2012, 39 pages.

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." Nasa Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

InfraTec GmbH. "Evaluation Kit for FPI Detectors | Datasheet—Detector Accessory." 2009. pp. 1-2.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/002077; Applicant: McAlister Technologies, LLC.; Date of Mailing: Apr. 29, 2011 (8 pages).

International Search Report and Written Opinion for Application No. PCT/US2010/002078; Applicant: McAlister Technologies, LLC.; Date of Mailing: Dec. 17, 2010 (9 pages).

International Search Report and Written Opinion for Application No. PCT/US2010/042812; Applicant: McAlister Technologies, LLC.; Date of Mailing: May 13, 2011 (9 pages).

International Search Report and Written Opinion for Application No. PCT/US2010/042815; Applicant: McAlister Technologies, LLC.; Date of Mailing: Apr. 29, 2011 (10 pages).

International Search Report and Written Opinion for Application No. PCT/US2010/042817; Applicant: McAlister Technologies, LLC.; Date of Mailing: Apr. 29, 2011 (8 pages).

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Non-Final Office Action for U.S. Appl. No. 12/006,774; Applicant: McAlister Technologies, LLC; Date of Mailing: Jan. 30, 2009, 18 pages.

Non-Final Office Action for U.S. Appl. No. 12/581,825; Applicant: McAlister Technologies, LLC; Date of Mailing: Mar. 25, 2011 (15 pages).

Non-Final Office Action for U.S. Appl. No. 12/804,510; Applicant: McAlister Technologies, LLC; Date of Mailing: Mar. 1, 2011 (10 pages).

Non-Final Office Action for U.S. Appl. No. 12/961,453; Applicant: McAlister Technologies, LLC; Date of Mailing: Jun. 9, 2011 (4 pages).

Notice of Allowance for U.S. Appl. No. 12/006,774; Applicant: McAlister Technologies, LLC; Date of Mailing: Jul. 27, 2009, 20 pages.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, Volume 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/054361; Applicant: McAlister Technologies, LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

* cited by examiner

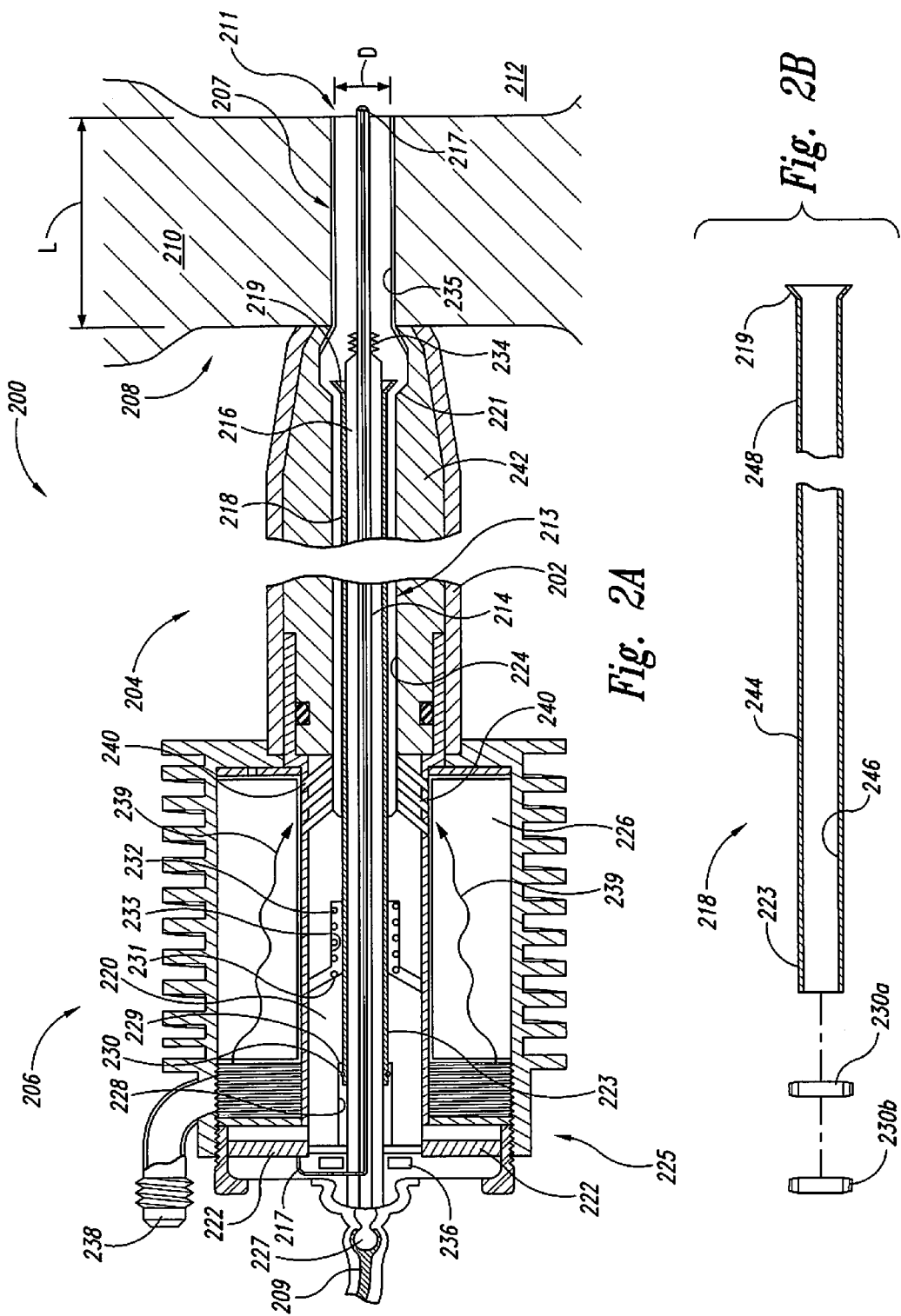

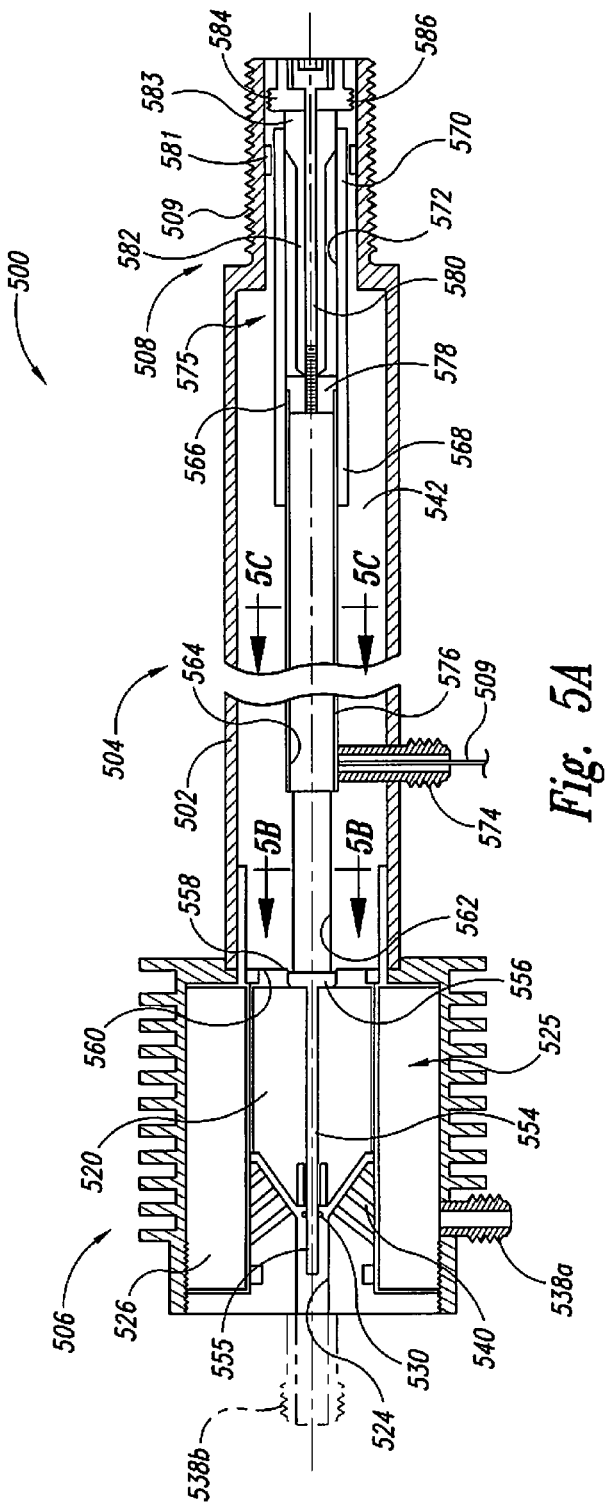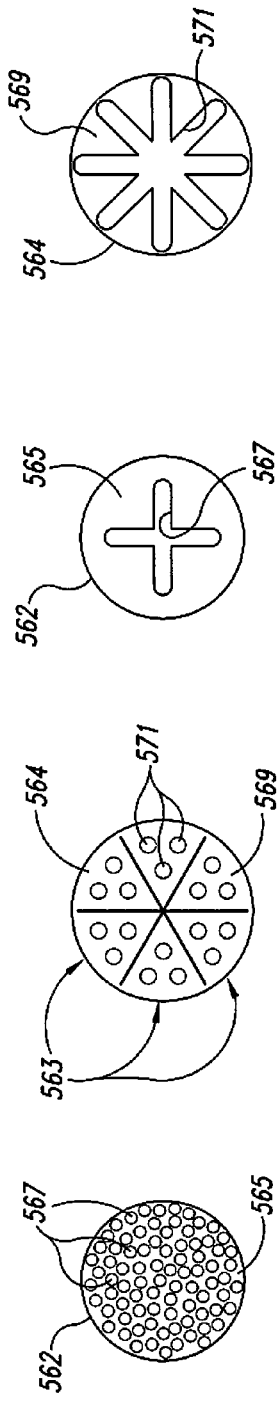
Fig. 5A
Fig. 5B
Fig. 5C
Fig. 5D
Fig. 5E

INTEGRATED FUEL INJECTOR IGNITERS SUITABLE FOR LARGE ENGINE APPLICATIONS AND ASSOCIATED METHODS OF USE AND MANUFACTURE

CROSS-REFERENCE TO RELATED APPLICATION(S)

The present application claims priority to and the benefit of each of the following: U.S. Provisional Application No. 61/304,403, filed Feb. 13, 2010 and titled FULL SPECTRUM ENERGY AND RESOURCE INDEPENDENCE, and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. The present application is a continuation-in-part of each of the following: U.S. patent application Ser. No. 12/841,170, filed Jul. 21, 2010 and titled INTEGRATED FUEL INJECTORS AND IGNITERS AND ASSOCIATED METHODS OF USE AND MANUFACTURE; U.S. patent application Ser. No. 12/804,510, filed Jul. 21, 2010 and titled FUEL INJECTOR ACTUATOR ASSEMBLIES AND ASSOCIATED METHODS OF USE AND MANUFACTURE; U.S. patent application Ser. No. 12/841,146, filed Jul. 21, 2010 and titled INTEGRATED FUEL INJECTOR IGNITERS WITH CONDUCTIVE CABLE ASSEMBLIES; U.S. patent application Ser. No. 12/841,149, filed Jul. 21, 2010 and titled SHAPING A FUEL CHARGE IN A COMBUSTION CHAMBER WITH MULTIPLE DRIVERS AND/OR IONIZATION CONTROL; U.S. patent application Ser. No. 12/841,135, filed Jul. 21, 2010 and titled CERAMIC INSULATOR AND METHODS OF USE AND MANUFACTURE THEREOF; U.S. patent application Ser. No. 12/804,509, filed Jul. 21, 2010 and titled METHOD AND SYSTEM OF THERMOCHEMICAL REGENERATION TO PROVIDE OXYGENATED FUEL, FOR EXAMPLE, WITH FUEL-COOLED FUEL INJECTORS; and U.S. patent application Ser. No. 12/804,508, filed Jul. 21, 2010 and titled METHODS AND SYSTEMS FOR REDUCING THE FORMATION OF OXIDES OF NITROGEN DURING COMBUSTION IN ENGINES. Furthermore, each of the preceding applications: claims priority to and the benefit of U.S. Provisional Application No. 61/237,425, filed Aug. 27, 2009 and titled OXYGENATED FUEL PRODUCTION; claims priority to and the benefit of U.S. Provisional Application No. 61/237,466, filed Aug. 27, 2009 and titled MULTIFUEL MULTIBURST; claims priority to and the benefit of U.S. Provisional Application No. 61/237,479, filed Aug. 27, 2009 and titled FULL SPECTRUM ENERGY; is a continuation-in-part of U.S. patent application Ser. No. 12/581,825, filed Oct. 19, 2009 and titled MULTIFUEL STORAGE, METERING AND IGNITION SYSTEM; is a continuation-in-part of PCT Application No. PCT/US09/67044, filed Dec. 7, 2009 and titled INTEGRATED FUEL INJECTORS AND IGNITERS AND ASSOCIATED METHODS OF USE AND MANUFACTURE; is a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; claims priority to and the benefit of U.S. Provisional Application No. 61/304,403, filed Feb. 13, 2010 and titled FULL SPECTRUM ENERGY AND RESOURCE INDEPENDENCE; and claims priority to and the benefit of U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. Moreover, U.S. patent application Ser. No. 12/581,825 is a divisional of U.S. patent application Ser. No. 12/006,774 (now U.S. Pat. No. 7,628,137), filed Jan. 7, 2008 and titled MULTIFUEL STORAGE, METERING AND IGNITION SYSTEM. PCT Application No. PCT/US09/67044 claims priority to and the benefit of U.S. Provisional Application No. 61/237,466, filed Aug. 27, 2009 and titled MULTIFUEL MULTIBURST. U.S. patent application Ser. No. 12/653,085 is a continuation-in-part of U.S. patent application Ser. No. 12/006,774 (now U.S. Pat. No. 7,628,137), filed Jan. 7, 2008 and titled MULTIFUEL STORAGE, METERING AND IGNITION SYSTEM; and claims priority to and the benefit of U.S. Provisional Application No. 61/237,466, filed Aug. 27, 2009 and titled MULTIFUEL MULTIBURST. Each of the applications referenced above is incorporated herein by reference in its entirety.

TECHNICAL FIELD

The following disclosure relates generally to integrated fuel injectors and igniters suitable for large engine applications and other sized engine applications for injecting and igniting various fuels in a combustion chamber.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Conventional fuel injection systems are typically connected to a pressurized fuel supply, and fuel injectors used in these fuel injection systems generally inject or otherwise release the pressurized fuel into the combustion chamber at a specific time relative to the power stroke of the engine. In many engines, and particularly in large engines, the size of the bore or port through which the fuel injector enters the combustion chamber is small. This small port accordingly limits the size of the components that can be used to actuate or otherwise inject fuel from the injector. Moreover, such engines also generally have crowded intake and exhaust valve train mechanisms, further restricting the space available for components of these fuel injectors.

BRIEF DESCRIPTION OF THE DRAWINGS

FIG. 2A is a partially exploded cross-sectional side view of an injector configured in accordance with another embodiment of the disclosure.

FIG. 2B is a cross-sectional side view of a flow valve configured in accordance with an embodiment of the disclosure.

FIGS. 3A-5A are a series of cross-sectional side views of injectors configured in accordance with further embodiments of the disclosure.

FIG. 5B is a cross-sectional side view of a first flow path taken substantially along the lines 5B-5B of FIG. 5A, and FIG. 5C is a cross-sectional side view of a second flow path taken substantially along the lines 5C-5C of FIG. 5A. FIG. 5D is a cross-sectional side view of an alternative embodiment of the first flow path taken substantially along lines 5B-5B of FIG. 5A, and FIG. 5E is a cross-sectional side view of an alternative embodiment of the second flow path taken substantially along the lines 5C-5C of FIG. 5A.

DETAILED DESCRIPTION

Figure 1:
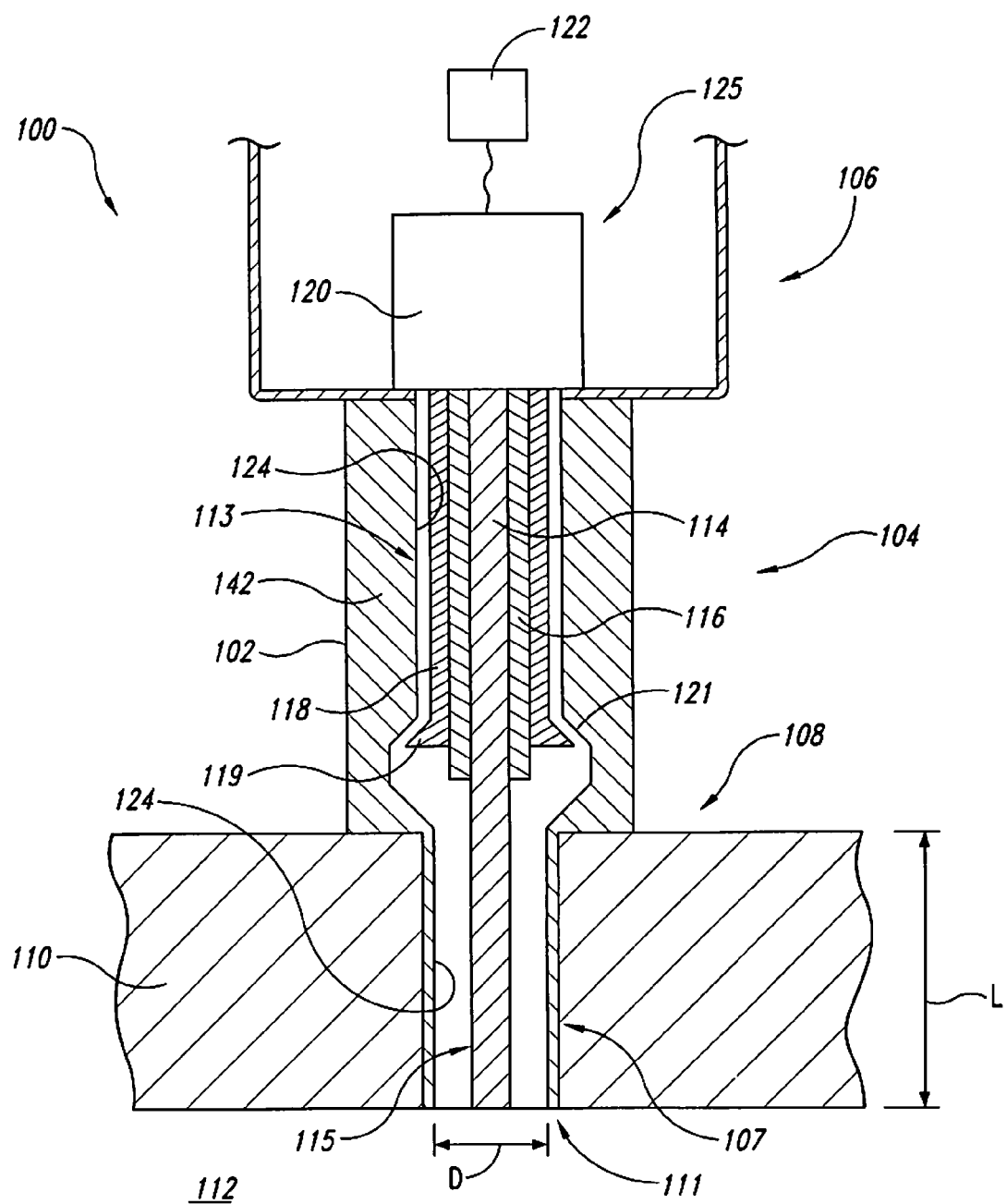
FIG. 1 is a schematic cross-sectional side view of an integrated injector/igniter ("injector") configured in accordance with an embodiment of the disclosure.

The present application incorporates by reference in its entirety the subject matter of the U.S. Patent Applications, filed concurrently herewith on Oct. 27, 2010 and titled: ADAPTIVE CONTROL SYSTEM FOR FUEL INJECTORS AND IGNITERS Ser No. 12/913,749; and FUEL INJECTOR SUITABLE FOR INJECTING A PLURALITY OF DIFFERENT FUELS INTO A COMBUSTION CHAMBER 61/407,437.

A. OVERVIEW

The present disclosure describes integrated fuel injection and ignition devices for use with internal combustion engines, as well as associated systems, assemblies, components, and methods regarding the same. For example, several of the embodiments described below are directed generally to adaptable fuel injectors/igniters that can optimize the injection and combustion of various fuels based on combustion chamber conditions. In certain embodiments, these fuel injectors/igniters are also particularly suited for large engine applications, such as retrofit assemblies as well as new assemblies, having limited space constraints for such injectors/igniters. Certain details are set forth in the following description and in FIGS. 1-6 to provide a thorough understanding of various embodiments of the disclosure. However, other details describing well-known structures and systems often associated with internal combustion engines, injectors, igniters, and/or other aspects of combustion systems are not set forth below to avoid unnecessarily obscuring the description of various embodiments of the disclosure. Thus, it will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure.

Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics described with reference to a particular embodiment may be combined in any suitable manner in one or more other embodiments. Moreover, the headings provided herein are for convenience only and do not interpret the scope or meaning of the claimed disclosure.

FIG. 1 is a schematic cross-sectional side view of an integrated injector/igniter 100 ("injector 100") configured in accordance with an embodiment of the disclosure. The injector 100 shown in FIG. 1 is intended to schematically illustrate several of the features of the injectors and assemblies described below. Accordingly, these features described with reference to FIG. 1 are not intended to limit any of the features of the injectors and assemblies described below. As shown in FIG. 1, the injector 100 includes a body 102 having a middle portion 104 extending between a first end portion or base portion 106 and a second end portion of nozzle portion 108. The base portion 106 is accordingly spaced apart from the nozzle portion 108.

The nozzle portion 108 is configured to at least partially extend through an engine head 110 to inject and ignite fuel at or near an interface 111 of a combustion chamber 112. In certain embodiments, the nozzle portion 108 can include components that are configured to fit within a relatively small injector port frequently used in large engine applications, such as in marine propulsion engines, for example. In the illustrated embodiment, for example an injection port 107, such as an injection port of a modern diesel engine, can have a diameter D of approximately 8.4 millimeters (0.33 inch) or less. In other embodiments, however, the diameter D can be greater than approximately 8.4 millimeters. As described in detail below, the injector 100 is particularly suited to provide adaptive and rapid actuation under high fuel delivery pressure, while eliminating unwanted fuel dribble into the combustion chamber 112, even in such relatively small injection ports 107. Moreover, as also described in detail below, the injector 100 is also configured to account for a relatively large distance or length L between the combustion chamber interface 111 and several actuating components carried by the body 102 that are spaced apart from the engine head 110. In modern diesel engines or other large engines, for example, crowded intake and exhaust valve train mechanisms at the engine head 110 may require separation lengths L of 12-36 inches, or more.

In the embodiment shown in FIG. 1, the injector 100 includes a core assembly 113 extending from the base portion 106 to the nozzle portion 108. The injector 110 also includes a body insulator 142 coaxially disposed over at least a portion of the core assembly 113. The core assembly 113 includes an ignition rod or conductor 114, an ignition insulator 116, and a valve 118. The ignition conductor 114 is operably coupled to a voltage source at the base portion 106 and extends from the base portion 106 through the nozzle portion 108. The ignition conductor 114 includes an end portion 115 proximate to the interface 111 of the combustion chamber 112 that includes one or more ignition features that are configured to generate an ignition event with the head 110. The ignition insulator 116 is coaxially disposed over at least a portion of the ignition conductor 114 and extends from the base portion 106 at least partially into the nozzle portion 108. The valve 118 is coaxially disposed over at least a portion of the insulator 116. In the illustrated embodiment, the valve 118 has a first length, the ignition insulator 116 has a second length greater than the first length, and the ignition conductor 114 has a third length greater than the second length. The valve 118 is configured to move between an open position (as shown in FIG. 1) and a closed position. More specifically, the valve 118 includes a sealing end portion 119 that rests against a corresponding valve seat 121 when the valve 118 is in the closed position. The valve seat 121 can be carried by the body insulator 142. As the valve 118 moves to the open position, the end portion 119 is spaced away from the valve seat 121 to allow fuel to flow or otherwise pass by the valve seat 121.

The injector 100 also includes a valve operator assembly 125 carried by the base portion 106. The valve operator assembly 125 includes at least an actuator or driver 120 and a processor or controller 122. More specifically, the driver 120 is positioned at the base portion 106 and is operably coupled to the valve 118. The driver 120 is also operably coupled to the controller 122. The driver 120 can be an actuated from any suitable force generating mechanism (e.g., electrical, electro-mechanical, magnetic, etc.) to engage and move the valve 118. The controller 122 can also be operably coupled to one or more sensors carried by the injector 100 or positioned elsewhere in an engine where the injector 100 is installed. These sensors can detect combustion chamber data or other engine-related data that can be correlated to combustion chamber data. In one embodiment, for example, the controller 122 can be operably coupled to sensors that are optical fibers carried by the ignition conductor 114. Accordingly, the controller 122 can direct or otherwise control the driver 120 to actuate the valve 118 in response to one or more combustion chamber properties.

In operation, fuel is introduced in the base portion 106 into a fuel flow path or channel 124. The fuel channel 124 extends between the body 102 and the valve 118 from the base portion 106 through the middle portion 104 to the nozzle portion 108. Precise metered amounts of fuel can be selectively and adaptively introduced into the combustion chamber 112 by the injector 100. For example, the driver 120 actuates the valve 118 to slide or otherwise move the valve 118 longitudinally along the insulator 116 to space the sealing end portion 119 of the valve 118 away from the valve seat 121. As the valve 118 moves between the open and closed positions in directions generally parallel with a longitudinal axis of the injector 100, the ignition conductor 114 and the insulator 116 remain stationary within the body 102. The insulator 116 therefore acts as a central journal bearing for the valve 118 and can accordingly have a low friction outer surface that contacts the valve 118. Moreover, and as discussed in detail below, the ignition conductor 114 can create an ignition event to ignite the fuel before or as the fuel enters the combustion chamber 112. As also discussed in detail below, the sealing end portion 119 of the valve 118 can be positioned at various locations within the injector 100 including, for example, within the injection port 107 and/or adjacent to the interface 111 of the combustion chamber 112.

FIG. 2A is a cross-sectional side view of an integrated injector/igniter 200 ("injector 200") configured in accordance with another embodiment of the disclosure. The embodiment illustrated in FIG. 2A includes several features that are generally similar in structure and function to the corresponding features of the injector 100 described above with reference to FIG. 1. For example, the injector 200 illustrated in FIG. 2 includes a body 202 having a middle portion 204 extending between a first end portion or base portion 206 and a second end portion or nozzle portion 208. The nozzle portion 208 is configured to be at least partially inserted into an injection port 207 in an engine head 210. As described in detail below, the injector 200 is configured to overcome the difficult problem with many modern diesel engines or other large engines that limit the size of the injector port 207 to about 8.4 mm (0.33 inch) or less in diameter, and that also limit the available space with crowded intake and exhaust valve train mechanisms often requiring a separation length L of approximately 12-36 inches more between an interface 211 at a combustion chamber 212 and the valve operating components of the injector 200.

According to features of the illustrated embodiment, the injector 200 also includes a core assembly 213 extending through the body 202 from the base portion 206 at least partially into the nozzle portion 208. The core assembly 213 facilitates the fuel injection and ignition. More specifically, the core assembly 213 includes a core or ignition insulator 216 coaxially disposed over an ignition rod or conductor 214. The core assembly 213 also includes a moveable tube valve 218 coaxially disposed over the core insulator 216. In the illustrated embodiment, the ignition conductor 214 is a stationary ignition member that can be an electrically conductive rod or Litz wire bundle. The ignition conductor 214 is coupled to an ignition or terminal 227 in the base portion 206 to receive voltage energy. More specifically, the ignition terminal 227 is coupled to a voltage supply conductor 209, which is in turn coupled to a suitable voltage source. In one embodiment, for example, the ignition terminal 227 can supply at least approximately 80 KV (DC or AC) to the ignition conductor 214. In other embodiments, however, the ignition terminal 227 can supply a greater or lesser voltage to the ignition conductor 214.

The ignition conductor 214 also includes one or more ignition features 234 positioned at the nozzle portion 208. In the illustrated embodiment, the ignition features 234 can be acicular threads or other types of projections extending circumferentially away from the ignition member 214. The ignition features 234 remain stationary and act as a first electrode. The inner diameter of the injection port 207 acts as a corresponding second electrode for creating an ignition event, such as a plasma ignition event. In certain embodiments, for example, and as shown in FIG. 2A, the nozzle portion 208 can include a thin conductive electrode liner or plating 235 on at least a portion of the inner surface or diameter of the injection port 207. The electrode liner 235 can be used to protect the inner surface of the injection port 207 from plasma erosion. In embodiments without the electrode liner 235, however, high frequency AC can be used to eliminate plasma erosion on the inner surface of the injection port 207.

In the illustrated embodiment, the ignition conductor 214 also includes one or more sensors, such as one or more optical fibers 217, disposed within the ignition conductor 214. The optical fibers 217 can extend longitudinally through the ignition conductor 214 and are configured to transmit data from the combustion chamber 212 to one or more components in the injector 100 or in the engine utilizing the injector 100.

According to certain features of the illustrated embodiment, the core insulator 216 remains stationary on the ignition conductor 214 and can be constructed from a ceramic insulator as disclosed in the co-pending applications incorporated by reference in their entireties above. In one embodiment, for example, the core insulator 216 can be made from a long-lead spiral form constructed from a PTFE or PEEK monofilament. In other embodiments, however, the core insulator 216 can be made from other materials suitable for containing the voltage delivered to and/or generated within the injector 200. For example, the core insulator 216 can be constructed from insulative materials suitable for containing 80 KV (DC or AC) at temperatures up to about 1000° F. In other embodiments, however, the insulator 216 can be configured to contain more or less voltage, as well as operate in hotter or colder temperatures. As also described in detail below, the core insulator 216 can also serve as a low friction central journal bearing surface for the valve 218 as the valve 218 moves between open and closed positions along the core insulator 216.

As shown in the illustrated embodiment, the valve 218 is an outwardly opening valve (e.g., opening in a direction toward the combustion chamber 212) that is movable along the insulator 216 to selectively introduce fuel from the nozzle portion 208 into the combustion chamber 212. More specifically, the valve 218 is configured to slide along the insulator 216 between open and closed positions and in directions that are generally parallel to a longitudinal axis of the injector 200. The valve 218 includes a first end portion 223 opposite a second or sealing end portion 219. The sealing end portion 219 forms a fluid tight seal against a corresponding valve seat 221 when the valve 218 is in a closed position. Further details of the valve 218 are described below with reference to FIG. 2B.

FIG. 2B is a partially exploded side cross-sectional view of the valve 218 shown in FIG. 2A. Referring to FIG. 2B, the valve 218 includes a hollow core or body 244 having an inner surface 246 opposite an outer surface 248. The body 244 can be made from reinforced structural composites as disclosed in U.S. patent application Ser. No. 12/857,461, filed Aug. 16, 2010, and entitled "INTERNALLY REINFORCED STRUCTURAL COMPOSITES AND ASSOCIATED METHODS OF MANUFACTURING," which is incorporated herein by reference in its entirety. For example the body 244 can be made from relatively low density spaced graphite or graphene structures that provides the benefits of reducing inertia, achieving high strength and stiffness, and providing high fatigue endurance strength. More specifically, the body 244 can be constructed from a light weight but strong graphite structural core that is reinforced by one or more carbon-carbon layers. The carbon-carbon layer(s) may be prepared from a suitable precursor application of carbon donor (e.g., petroleum pitch or a thermoplastic such as a polyolefin or PAN). The one or more carbon-carbon layers can further provide radio frequency shielding and protection. Additional protection may be established by plating the outer surface 248 with a suitable alloy, such as a nickel alloy that may be brazed to the body 244 by a suitable braze alloy composition. The inner surface 246 is configured to slide or otherwise move along the core insulator 216 (FIG. 2A). Accordingly, at least a portion of the inner surface 246 can include a suitable low friction coating, such as a polyimide, PEEK, Parylene H, or a PTFE copolymer, to facilitate the movement of the valve 218 along the core insulator 216 (FIG. 2A). In addition, the outer surface 248 can also include high strength materials, such as graphite filament reinforced polyimide or graphite tape with thermoset adhesives.

According to further features of the illustrated embodiment, the valve 218 includes the enlarged sealing end portion 219 that is configured to seal against or otherwise rest on the valve seat 221 (FIG. 2A) when the valve 218 is in the closed position. The sealing end portion 219 has a generally funnel shape or a generally annularly flared shape having a diameter that is greater than the diameter of the body 244. More specifically, the sealing end portion 219 is an end portion of the body 244 that has a gradually increasing diameter. In certain embodiments, the sealing end portion 219 can include an elastomeric coating or elastomeric portion to facilitate sealing with the corresponding valve seat 221 (FIG. 2A). In the illustrated embodiment, for example, the exterior surface 248 of the sealing end portion 219 can include an elastomeric ring or coating, such as a fluorosilicone coating, a perfluoroelastomer, or other fluoroelastomers, to at least partially conform to the shape of the corresponding valve seat. In other embodiments, such as for inwardly opening valves as described in detail below, the inner surface 246 can include the elastomeric ring or coating to facilitate sealing with a corresponding valve seat. Moreover, in still further embodiments the valve seat that contacts the sealing end portion 219 can include an elastomeric coating or elastomeric portion to facilitate sealing.

In the illustrated embodiment, the valve 218 also includes one or more stop members or stop collars 230 (identified individually as a first stop collar 230a and a second stop collar 230b) that can be attached to the outer surface 248 of the first end portion 223. Although the stop collars 230 are shown as separate components from the valve 218 in FIG. 2B, in other embodiments the stop collars 230 can be integrally formed on the outer surface 248 of the valve 218. As described in detail below, the stop collars 230 are configured to contact or otherwise engage an actuator or driver in the injector 200 to move the valve 218 between the open and closed positions.

Referring again to FIG. 2A, and as discussed in detail below, when the valve 218 is actuated to an open position, the sealing end portion 219 of the valve 218 becomes spaced apart from the valve seat 221 to selectively introduce fuel into the injection port 207. As shown in the illustrated embodiment, the valve seat 221 is positioned adjacent to the end of the core insulator 216. The valve seat 221 is also positioned adjacent to the ignition features 235 of the ignition conductor 214. In other embodiments, however, the ignition features 235 can be positioned at other locations relative to the valve seat 221 including, for example, at a location spaced apart from the valve seat 221 and proximate to the interface 211 of the combustion chamber 212.

The first end portion 223 of the valve 218 is operably coupled to a valve operator assembly 225. The valve operator assembly 225 is configured to selectively move the valve 218 between the open and closed positions. More specifically, the valve operator assembly 225 includes a driver 220 operably coupled to the valve 218, a force generator 226 (shown schematically) configured to induce movement of the driver 220, and a processor or controller 222 operably coupled to the force generator 226. The force generator 226 can be any suitable type of force generator for inducing movement of the driver 220 including, for example, electric, electromagnetic, magnetic, and other suitable force generators as disclosed in any of the patents and patent applications incorporated by reference above. Moreover, the controller 222 can also be coupled to one or more sensors positioned throughout the injector 200.

The driver 220 is coaxially disposed over the first end portion 223 of the valve 218 and includes a stop cavity 228 having a first contact surface 229 that engages the one or more stop collars 230 on the first end portion 223 of the valve 218. A biasing member or spring 232 engages a second contact surface 231 of the driver 220 opposite the first contact surface 229. The spring 232 is positioned within a spring cavity 233 in the base portion 206. Accordingly, the spring 232 urges the driver 220 in a direction away from the nozzle portion 208 (e.g., toward the base portion 206). As the spring 232 urges the driver 220 toward the base portion 206, the first contact surface 229 engages the stop collar 230 on the valve 218 to tension the valve 218 or otherwise urge the valve 218 toward the base portion 206 to retain the sealing end portion 219 of the valve 218 against the valve seat 221 in a normally closed position. In certain embodiments, the valve operator assembly 225 can also include one or more additional biasing members 236, such as electromagnets or permanent magnets, which can selectively bias the driver 220 toward the base portion 206 to tension the valve 218 in the normally closed position between injection events.

The base portion 206 also includes a fuel fitting or inlet 238 configured to introduce fuel into the injector 200. The fuel can travel from the fuel inlet 238 through the force generator 226 as indicated by base portion fuel paths 239. The fuel exits the force generator 226 through multiple exit channels 240 fluidly coupled to a fuel flow path or channel 224 extending longitudinally adjacent to the core assembly 213. More specifically, the fuel flow path 224 extends between the valve 218 and an inner surface of an insulative body 242 of the middle portion 204 and the nozzle portion 208. The electrically insulated body 242 can be made from a ceramic or polymer insulator suitable for containing the high voltage developed in the injector 200, as disclosed in the patent applications incorporated by reference in their entireties above. When the sealing end portion 219 of the valve 218 contacts the valve seat 221, the sealing end portion 219 seals or otherwise closes the fuel flow path 224. However, as the driver 220 opens the valve 218, fuel flows toward the combustion chamber 212 past the valve seat 221 and sealing end portion 219. As fuel flows toward the combustion chamber 212, the ignition conductor 214 conveys DC and/or AC voltage from 209 to ionization initiation features 234 to ionize and rapidly propagate and thrust the fuel toward the combustion chamber. In certain embodiments, for example, when the force generator 226 actuates the driver 220 to in turn move the valve 218, fuel flows by the ignition features 234 of the ignition conductor 214. As the fuel flows, the ignition features 234, the ignition features 234 generate an ignition event to partially or substantially ionize the fuel by application of ionizing voltage to the voltage terminal 227 via the voltage supply conductor 209. More specifically, ignition voltage applied to the ignition features 234 develops plasma discharge blasts of ionized fuel that is rapidly accelerated and injected into the combustion chamber 212. Generating such high voltage at the ignition features 234 initiates ionization, which is then rapidly propagated as a much larger population of ions in plasma develops and travels outward to thrust fuel past the interface 211 into the combustion chamber 212 into surplus air to provide insulation of more or less adiabatic stratified chamber combustion. As such, the injector 200, as well as other injectors described herein, is capable of ionizing air within the injector prior to introducing fuel into the ionized air, ionizing fuel combined with air, as well as layers of ionized air without fuel and ionized fuel and air combinations, as disclosed in the patent applications incorporated by reference in their entireties above.

Figure 3A:
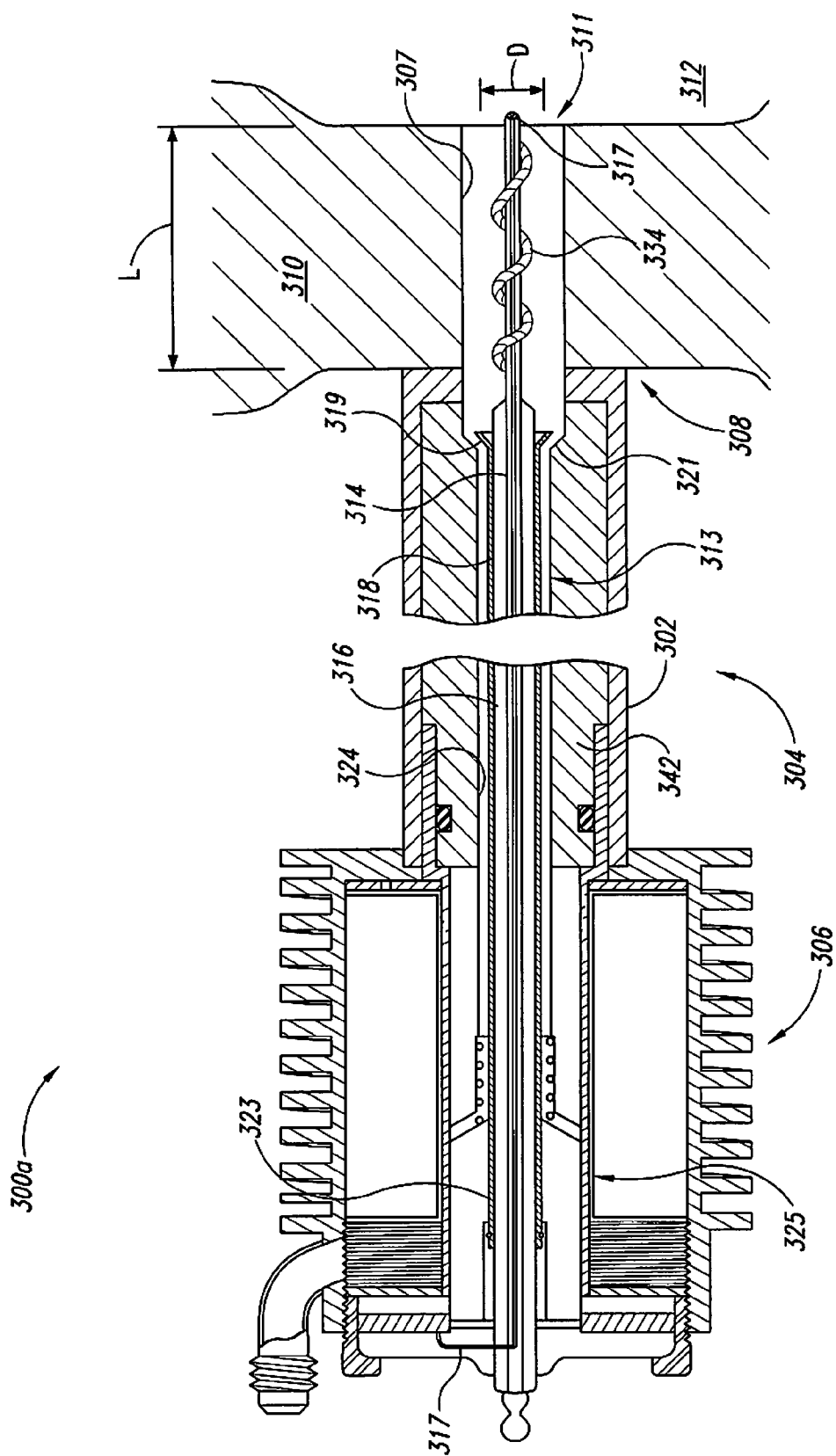

FIG. 3A is a cross-sectional side view of an integrated injector/igniter 300a ("injector 300a") configured in accordance with another embodiment of the disclosure. The injector 300a illustrated in FIG. 3A includes several features that are generally similar in structure and function to the corresponding features of the injectors described above with reference to FIGS. 1-2B. For example, as shown in FIG. 3A, the injector 300a includes a body 302 having a middle portion 304 extending between a first end portion or base portion 306 and a second end portion or nozzle portion 308. The nozzle portion 308 at least partially extends into an injection port 307 in a cylinder head 310. In certain embodiments, the nozzle portion 308 is configured to fit within an injection port 307 having a diameter D of approximately 8.4 millimeters (0.33 inch) or less, such as modern diesel injection ports, for example. In other embodiments, however, the nozzle portion 308 can fit within a diameter D that is larger. The injector 300a also includes a valve operator assembly 325 carried by the base portion 306. The valve operator assembly 325 is operably coupled to a core assembly 313 for injecting and igniting fuel into a combustion chamber 312.

The core assembly 313 includes a stationary core insulator 316 coaxially disposed over a stationary ignition member or conductor 314. The ignition conductor 314 can include one or more sensors or fiber optic cables 317 extending longitudinally therethrough to transmit data from the combustion chamber 312 to the valve operator assembly 325 or another controller. The core assembly 313 also includes a tube valve 318 coaxially disposed over the core insulator 316. The valve 318 includes a first end portion 323 at the base portion 306 that engages the valve operator assembly 325. The valve 318 also includes a second or sealing end portion 319 that engages or otherwise contacts a valve seat 321 carried by a body insulator 342. The valve operator assembly 325 actuates or moves the valve 318 along the core insulator 316 between an open position (as shown in FIG. 3A) and a closed position. In the open position, the sealing end portion 319 of the valve 318 is spaced apart from the valve seat 321 to allow fuel to flow from a fuel flow path or channel 324 past the valve seat 321 into the nozzle portion 308. The fuel flow channel 324 extends through the body 302 in an annular space between the valve 318 and the body insulator 342.

In the embodiment shown in FIG. 3A, the sealing end portion 319 of the valve 318 is smaller than the injection port 307. More specifically, the sealing end portion 319 has a maximum outer diameter that is less than the diameter D of the injection port 307. As also shown in the illustrated embodiment, the sealing end portion 319 is spaced apart from a combustion chamber interface 311 by a relatively large distance or length L. More specifically, in the illustrated embodiment, the length L is approximately equal to a thickness of the engine head 310, which can be 12 or more inches in some cases. In other embodiments, however, and as described in detail below with reference to FIG. 3B, for example, the sealing end portion 319 of the valve 318 can be positioned at other locations relative to the interface 311. Accordingly, the injector 300a illustrated in FIG. 3A is configured to account for a relatively large length L between the combustion chamber interface 311 and the sealing end portion 319 of the valve 318. In modern diesel engines or other large engines, for example, crowded intake and exhaust valve train mechanisms may require separation lengths L of 12-36 inches, or more.

According to additional features of the illustrated embodiment, the injector 300a also includes one or more ignition features 334 extending along a portion of the ignition conductor 314. The ignition features 334 are configured to generate an ionization, propulsive thrust and/or ignition event with the head 310. More specifically, as shown in FIG. 3A the ignition features 334 can be made of a conductive material that is spirally wound around the ignition conductor 314 in a coiled or corkscrew configuration including brush-like whisker or rod-like conductors. The ignition features 334 accordingly extend away from the ignition conductor 314 toward the inner surface of the injection port 307. When ignition energy is applied to the ignition features 334 via the ignition conductor 314, the ignition features 334 generate an ignition event (e.g., a plasma spark) to ignite or ionize fuel, air, and/or air and fuel mixtures. In embodiments where the ignition event is a plasma event, ignition by the plasma blast ionizes the fuel and accelerates the ionized fuel into the combustion chamber 312.

Figure 3B:
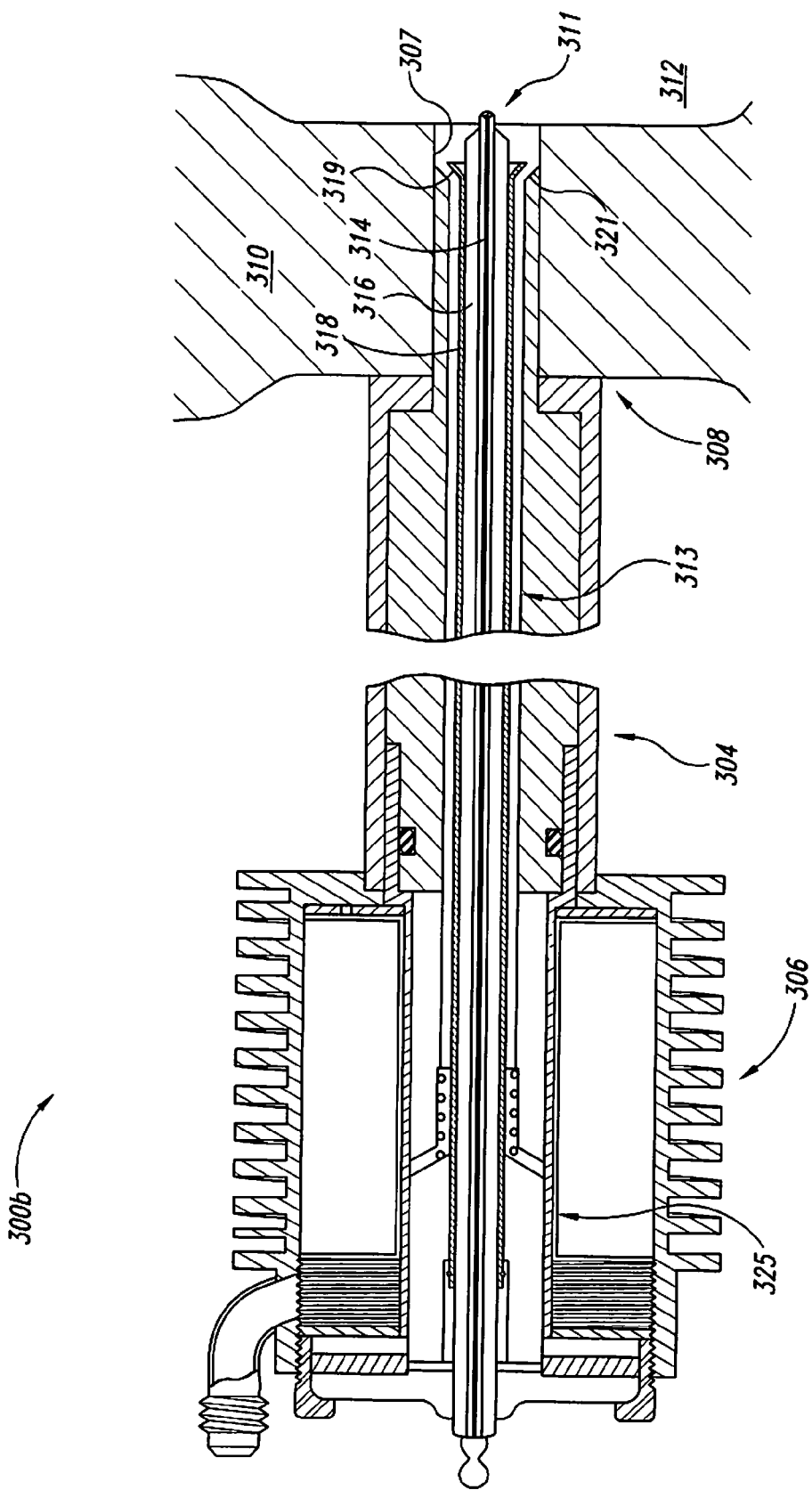

FIG. 3B is a cross-sectional side view of an integrated injector/igniter 300b ("injector 300b") configured in accordance with yet another embodiment of the disclosure. The illustrated injector 300b includes several of the same features of the injector 300a illustrated in FIG. 3A. For example, the injector 300b illustrated in FIG. 3B includes the core assembly 313 operably coupled to the valve operator assembly 325. The core assembly 313 includes the ignition conductor 314, the core insulator 316, and the valve 318, and extends from the base portion 306 at least partially into the nozzle portion 308. In the illustrated embodiment, however, the sealing end portion 319 of the valve 318 is positioned adjacent to or slightly recessed from the interface 311 of the combustion chamber 312. More specifically, the valve seat 321 and the sealing end portion 319 of the valve 318 are positioned in the injection port 307 at a location that is adjacent or proximate to the combustion chamber interface 311. Accordingly, the ignition conductor 314 includes one or more ignition features downstream from the sealing end portion 319 of the valve 318 and proximate to the combustion chamber interface 311 to generate the ignition event at the combustion chamber interface 311.

Figure 4:
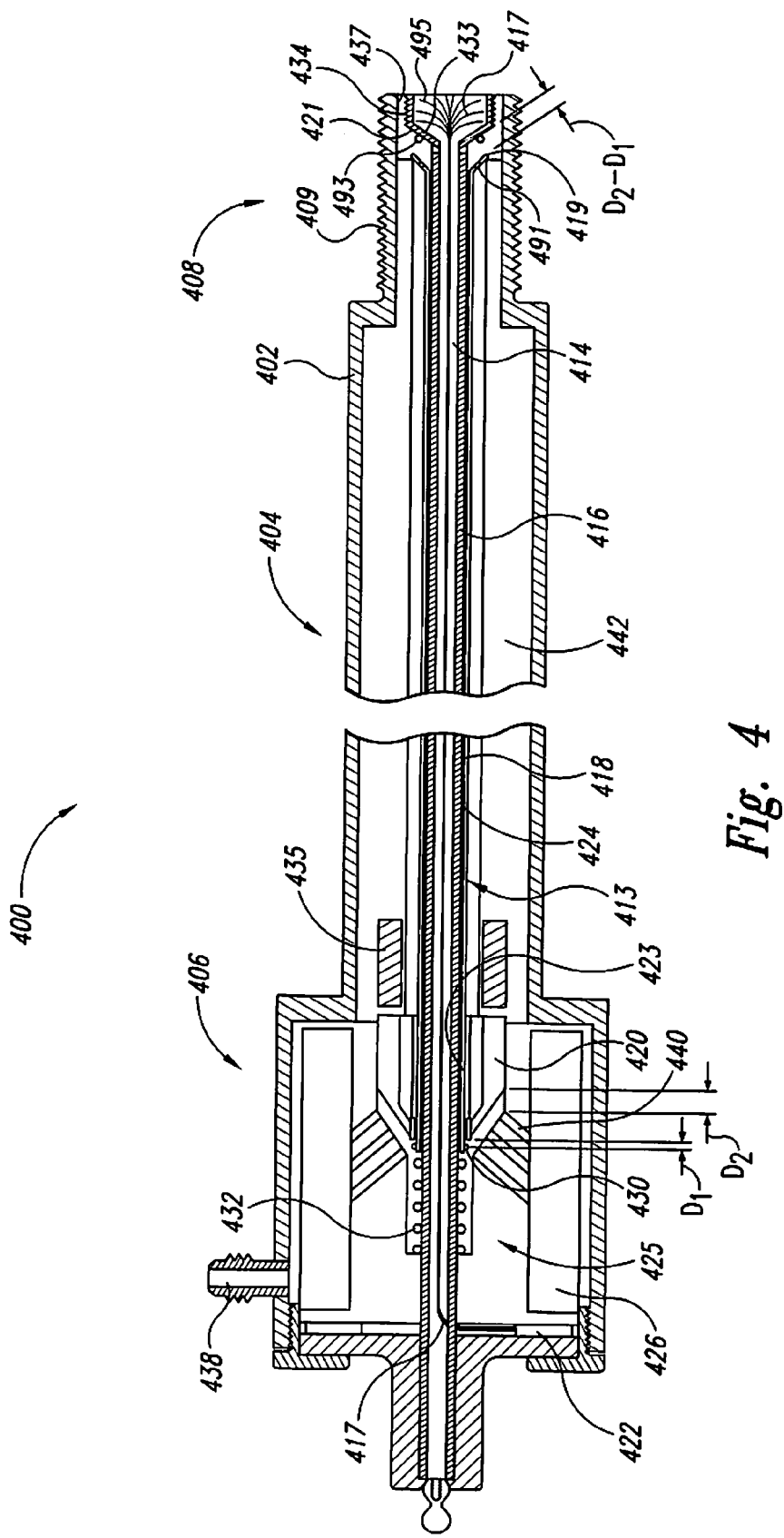

FIG. 4 is a cross-sectional side view of an integrated injector/igniter 400 ("injector 400") configured in accordance with another embodiment of the disclosure. The injector 400 illustrated in FIG. 4 includes several features that are generally similar in structure and function to the corresponding features of the injectors described above with reference to FIGS. 1-3B. For example, as shown in FIG. 4, the injector 400 includes a body 402 having a middle portion 404 extending between a first end portion or base portion 406 and a second end portion or nozzle portion 408. The nozzle portion 408 is configured to extend into a threaded 14 millimeter spark plug port in a cylinder head or it may have a nozzle such as shown in FIG. 1, 3A, 3B, or 6 to fit within a port having a diameter of approximately 8.4 millimeters (0.33 inch) or less, as found in many modern diesel injection ports for example. In other embodiments, however, the nozzle portion 408 can be configured for different sized injection ports. The nozzle portion 408 may further include another thread selection exterior surface 409 for suitable secure engagement with respect to the combustion chamber.

The injector 400 also includes a valve operator assembly 425 carried by the base portion 406. The valve operator assembly 425 is operably coupled to a core assembly 413 for injecting and igniting fuel in a combustion chamber. The core assembly 413 includes a stationary core insulator 416 coaxially disposed over a stationary ignition member or conductor 414. The ignition conductor 414 can include one or more sensors or fiber optic cables 417 extending longitudinally therethrough to transmit data from the combustion chamber to the valve operator assembly 425, which can include a controller or processor 422 or a wireless or cable connected communication node to a suitable computer, controller or processor. In the illustrated embodiment, the ignition conductor 414 includes an enlarged or expanded end portion 433 configured to be proximate to the interface with the combustion chamber. The expanded end portion 433 provides an increased area for the fiber optic cables 417 at the interface with the combustion chamber. The expanded end portion 433 also carries one or more ignition features 434 that are configured to generate an ignition event with an inner surface 437 of the nozzle portion 408. More specifically, in the illustrated embodiment the ignition features 434 can include a plurality of threads or acicular protrusions extending circumferentially around the expanded end portion 433 of the ignition conductor 414. The expanded end portion 433 also includes a valve seat 421, as described in further detail below.

The core assembly 413 extends through an insulative body 442 of the body 402. The insulative body 442 can be made from a ceramic or polymer insulator suitable for containing the high voltage developed in the injector 400. The core assembly 413 also includes a tube valve 418 coaxially disposed over the core insulator 416. In the embodiment illustrated in FIG. 4, however, the valve 418 is an inwardly opening valve (e.g., opening in a direction away from the combustion chamber) and is movable relative to the core insulator 414 to selectively introduce fuel from the nozzle portion 408 into the combustion chamber. More specifically, the valve 418 is configured to slide or otherwise move relative to the core insulator 416 in directions that are generally parallel to a longitudinal axis of the injector 400. The valve 418 can be similar in structure to the valve described above and can include, for example, a light weight but strong graphite structural core reinforced by a carbon-carbon layer. The valve 418 includes a first end portion 423 in the base portion 406 that engages the valve operator assembly 425. The valve 418 also includes a second or sealing end portion 419 that engages or otherwise contacts a valve seat 421 in the nozzle portion 408 carried by an ignition conductor 414. The sealing end portion 419 and/or the valve seat 421 can include one or more elastomeric portions as described in detail above. The valve operator assembly 425 actuates the valve 418 relative to the core insulator 416 between an open position (as shown in FIG. 4) and a closed position. In the open position, the sealing end portion 419 of the valve 418 is spaced apart from the valve seat 421 to allow fuel to flow from a fuel flow path or channel 424 past the valve seat 421 and out of the nozzle portion 408. The fuel flow channel 424 extends through the middle portion 404 between the valve 418 and the core insulator 416.

The valve operator assembly 425 includes a force generator 426 (e.g., an electric, electromagnetic, magnetic, etc. force generator) that induces movement of a driver 420. The force generator 426 can also be operably coupled to a processor or controller 422, which can in turn also be coupled to the one or more fiber optic cables 417 extending through the ignition conductor 414. As such, the controller 422 can selectively energize or otherwise activate the force generator 426, for example, in response to one or more combustion chamber conditions or engine parameters. The driver 420 engages one or more stops 430 integrally formed with or otherwise attached to the first end portion 423 of the valve 418 to move the valve 418 between the open and closed positions. The valve operator assembly 425 can also include a first biasing member 432 that contacts the valve 418 and at least partially urges the valve 418 to the closed position in a direction toward the nozzle portion 408. The valve operator assembly 425 can further include a second biasing member 435 that at least partially urges the driver 420 toward the nozzle portion 408. In certain embodiments, the first biasing member 432 can be a spring, such as a coil spring, and the second biasing member 435 can be a magnet or a permanent magnet. In other embodiments, however, the first biasing member 432 and the second biasing member 435 can include other components suitable for providing a biasing force against the valve 418 and the driver 420.

According to additional features of the embodiment illustrated in FIG. 4, the nozzle portion 408 can include additional features for detecting or otherwise collecting and transmitting data from the combustion chamber to one or more controllers via the injector 400. For example, the nozzle portion 408 can include one or more openings 491 in the sealing end portion 419 of the valve 418, to allow relevant data from the combustion chamber to be at least partially transmitted through the injector 400. The nozzle portion 408 can further include a pressure seal 493 carried by the valve seat 421, as well as one or more temperature sensors 495 carried by the fiber optic cables 417. These detecting features can be configured for detecting, sensing, or otherwise transmitting relevant combustion chamber data, such as temperature data, optical data, pressure data, thermal data, acoustic data, and/or any other data from the combustion chamber.

In operation, fuel enters the base portion 406 via a fuel fitting or inlet 438. The fuel inlet 438 introduces the fuel into the force generator 426, and the fuel exits the force generator 426 through multiple exit channels 440 fluidly coupled to the fuel flow path 424 extending longitudinally adjacent to the core assembly 413. As the valve operator assembly 425 moves the valve 418 from the closed position to the open position (e.g., in a direction away from the combustion chamber), the nozzle portion 408 injects and ignites the fuel. More specifically, when the force generator 426 induces the movement of the driver 420, the driver 420 moves a first distance $D_1$ prior to contacting the stop 430 carried by the valve 418. As such, the driver 420 can gain momentum or kinetic energy before engaging the valve 418. After the driver 420 contacts the stop 430, the driver 420 continues to move to a second distance $D_2$ while engaging the valve 418 to exert a tensile force on the valve 418 and move the valve 418 to the open position. As such, when the valve is in the open position (as illustrated in FIG. 4), the sealing end portion 419 of the valve 418 is spaced apart form the valve seat 421 by an open distance generally equal to the second distance $D_2$ minus the first distance $D_1$. As the fuel flows past the open sealing end portion 419 of the valve 418, the one or more ignition features 434 can generate a fuel ionization, air ionization and/or an ionization of mixed fuel and air event to combust the fuel as a stratified charge in the combustion chamber. The drivers or actuators of any of the injectors described herein can accordingly move a predetermined distance to at least partially gain momentum before engaging the corresponding valve.

FIG. 5A is a cross-sectional side view of an integrated injector/igniter 500 ("injector 500") configured in accordance with another embodiment of the disclosure. The injector 500 illustrated in FIG. 5 includes several features that are generally similar in structure and function to the corresponding features of the injectors described above with reference to FIGS. 1-4. For example, as shown in FIG. 5, the injector 500 includes a body 502 having a middle portion 504 extending between a first end portion or base portion 506 and a second end portion or nozzle portion 508. The nozzle portion 508 is configured to extend into a threaded injection port in a cylinder head as shown, or it may be configured as shown in FIG. 1, 3A or 3B or 6 to fit within a port having a diameter of approximately 8.4 millimeters (0.33 inch) or less, as found in many modern diesel injection ports for example. In other embodiments, however, the nozzle portion 508 can be configured for different sized injection ports. The nozzle portion 508 may further include any number of alternate thread selections on the exterior surface 509 for suitable engagement with the combustion chamber.

The injector 500 also includes a valve operator assembly 525 at the base portion 506. The valve operator assembly 525 is configured to actuate multiple valves positioned throughout the body 502 of the injector 500. More specifically, the valve operator assembly 525 includes a force generator 526 (e.g., a piezoelectric, electromagnetic, magnetic, etc. force generator) that induces movement of a driver 520. The force generator 526 can also be operably coupled to a processor or controller to selectively pulse or activate the force generator 526, for example, in response to one or more combustion chamber conditions or engine parameters. The driver 520 engages a first check valve or base valve 554 at the base portion 506. More specifically, the base valve 554 may include one or more stops 530 that engage the driver 520 such that the driver 520 moves the base valve 554 between open and closed positions (the base valve 554 is shown in the closed position in FIG. 5A). The one or more stops 530 can be attached to or otherwise integrally formed with a first end portion 555 of the base valve 554. The base valve 554 also includes a base valve head or sealing portion 556 opposite the first end portion 558 of conduit component 542 as shown. Thus base valve head 556 engages a corresponding valve seat 558 at a transition from the base portion 506 to the middle portion 504 of the injector 500.

According to additional features of the illustrated embodiment, the injector 500 also includes an insulative body 542 extending through at least the middle portion 504 and the nozzle portion 502. The insulative body 542 can be made from a ceramic or polymer insulator suitable for containing the high voltage developed in the injector 500. The injector 500 further includes a fuel flow path extending through the insulative body 542. More specifically, in the injector 500 includes a first fuel flow section 562 extending away from the check valve 554 into the middle portion 504. The first fuel flow section 562 is fluidly coupled to a second fuel flow section 564 and extends from the middle portion 504 into the nozzle portion 508.

In certain embodiments, the first fuel flow section 562 and the second fuel flow section 564 can be made from materials that accommodate fuel expansion and contraction to at least partially prevent fuel dribble from the nozzle portion 508 at the combustion chamber interface. More specifically, each of the first fuel flow path 562 and the second fuel flow path 564 can include one or more channels extending through a closed cell spring, such as a closed cell foam spring, having a suitable cross-section to allow the fuel to flow therethrough. In certain embodiments, the first and second flow paths 562, 564 can be made from materials with suitable thermal and chemical resistance, as well as fatigue resistance. More specifically, these materials can include silicone, fluorosilicone, and various fluoropolymers including, for example, PFA, PTFE, PVDF, and other copolymers. These components can be extruded or injection molded with numerous open or closed cells or closed volumes that are filled with a gas or working fluid. For example, such a gas can include argon, carbon dioxide, nitrogen, etc, and such a working fluid can include ammonia, propane, butane, fluorinated methane, ethane, or butane. Moreover, this gas or working fluid provides an inventory of liquid and vapor that can serve as an evaporant upon heat addition, and a phase condenser upon heat loss, to thereby serve as a combined spring and thermal flywheel or barrier against adverse expansion and fuel dribble at the combustion chamber interface.

FIGS. 5B and 5D illustrate various embodiments of suitable cross-sectional shapes of the first fuel flow path 562, and FIGS. 5C and 5E illustrate various embodiments of suitable cross-sectional shapes of the second fuel flow path 564. More specifically, FIG. 5B is a cross-sectional view of the first flow path 562 taken substantially along lines 5B-5B of FIG. 5A. In the embodiment illustrated in FIG. 5B, the first fuel flow path 562 includes a first flow path guide 565 including multiple first flow passages or channels 567. The first guide 565 can be made from a closed cell spring material, and the channels 567 extend longitudinally through the first guide 565. FIG. 5C is a cross-sectional view of the second flow path 564 taken substantially along lines 5C-5C of FIG. 5A. In the embodiment illustrated in FIG. 5C, the second flow path 564 includes a second flow path guide 569 including multiple separate regions or sections 563 with corresponding second flow passages or channels 571. Although six regions 563 are shown in the illustrated embodiment, in other embodiments the second guide 569 can include a greater or lesser number of second channels 571. The second flow channels extend longitudinally through the second guide 569. FIG. 5D is a cross-sectional view of an alternative embodiment of the first flow path 562 taken substantially along lines 5B-5B of FIG. 5A. In the embodiment illustrated in FIG. 5D, the first fuel flow path 562 includes a first flow path guide 565 including a cross-shaped first flow passage or channel 567. The first guide 565 can be made from a closed cell spring material, and the channel 567 extends longitudinally through the first guide 565. FIG. 5E is a cross-sectional view of the second flow path 564 taken substantially along lines 5C-5C of FIG. 5A. In the embodiment illustrated in FIG. 5E, the second flow path 564 includes a second flow path guide 569 including multiple a second star shaped flow passages or channel 571. The second flow channel 571 extends longitudinally through the second guide 569.

Referring again to FIG. 5A, at the nozzle portion 508 the injector 500 further includes a radially expanding sleeve or flow valve 566 operably coupled to a core or ignition assembly 575. The ignition assembly 575 includes a stationary ignition conductor 576 coaxially disposed over at least a portion of the second flow section 564. In certain embodiments, the ignition conductor 576 can be a conductive casing or cover, such as a metallic casing or metallic plated ceramic, disposed over the second flow section 564. The ignition conductor 576 is coupled to a voltage supply conductor 509 via a voltage terminal 574. The voltage supply conductor 509 is in turn coupled to a suitable voltage source. In one embodiment, the ignition terminal 574 can supply at least approximately 80 KV (DC or AC) to the ignition conductor 576. In other embodiments, however, the ignition terminal 574 can supply a greater or lesser voltage to the ignition conductor 576. The ignition assembly 575 also includes an ignition adapter 578 coupled to the ignition conductor 576. The ignition adapter 578 provides one or more fuel passage ways 578H and is also coupled to a nozzle ignition conductor or rod 580. The ignition rod 580 is threadably received into the ignition adapter 578 and extends from the ignition adapter 578 to a distal end portion of the nozzle portion 508 to be positioned at the interface with the combustion chamber. In the illustrated embodiment, the ignition rod 580 includes an ignition member or electrode 584 positioned at the nozzle portion 508. The ignition electrode 584 can be a separate component that is attached to the ignition rod 580. In other embodiments, however, the ignition electrode 584 can be integrally formed with the ignition rod 580. Moreover, the ignition features 586 can include smooth portions and/or acicular threads or other types of projections extending circumferentially away from the ignition electrode 584. The ignition electrode 584 and corresponding ignition features 586 remain stationary and act as a first electrode. The inner diameter of the nozzle portion 508 acts as a corresponding second electrode for creating an ignition event, such as a plasma ignition event, with the ignition features 586.

The ignition assembly 575 also includes an ignition insulator 582 coaxially disposed over at least a portion of the ignition electrode 584. The ignition insulator 582 can be made from a suitable insulative or dielectric material and accordingly insulates ignition rod 580 from the ignition electrode 509. The ignition insulator 582 includes an enlarged end portion 583 having a greater cross-sectional dimension (e.g., diameter) adjacent to the ignition electrode 584. The enlarged end portion 583 is configured to contact the flow valve 566 as shown during the normally closed position. According to additional features of the illustrated embodiment, the nozzle portion 508 may also include one or more biasing members 581 configured to bias or otherwise attract portions of the flow valve 566.

In the illustrated embodiment the flow valve 566 is a radially opening or expanding flow valve. More specifically, the flow valve 566 is a deformable or elastomeric sleeve valve 566 that is coaxially disposed over at least a portion of the second fuel flow section 564, the ignition conductor 576, the ignition adapter 578, the ignition rod 580, and the ignition insulator 582 as shown. The flow valve 566 includes a first or stationary end portion 568 that is anchored, adhered, or otherwise coupled to the ignition conductor 576 at a location downstream from the ignition insulator 582. For example, the first end portion 568 can be adhered to the ignition conductor 576 with a suitable adhesive, thermopolymer, thermosetting compound, or other suitable adhesive. The flow valve 566 further includes a second deformable or movable end portion 570 opposite the stationary end portion 568. The movable end portion 570 contacts the enlarged end portion 583 of the ignition insulator 582 and is configured to at least partially radially expand, enlarge, or otherwise deform to allow fuel to exit the nozzle portion 508 of the injector 500. Further details of the embodiments of the flow valve 566 are discussed below with reference to FIGS. 5F and 5G.

Figure 5F:
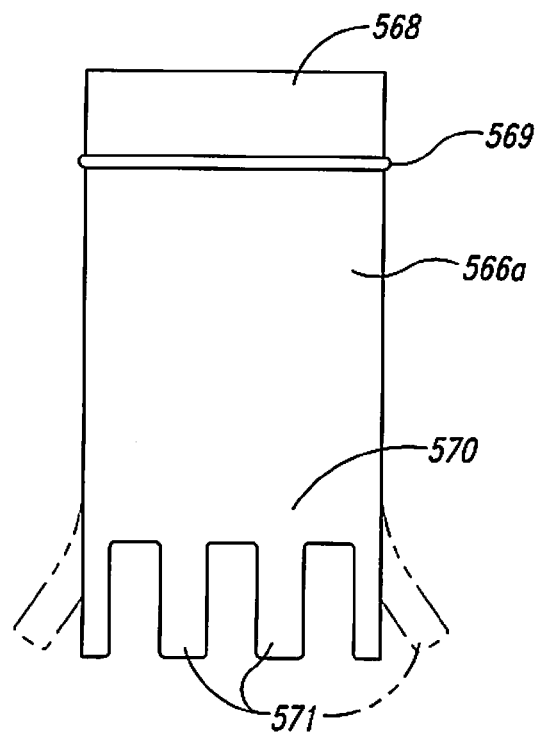
FIGS. 5F and 5G are side views of flow valves configured in accordance with embodiments of the disclosure.

FIG. 5F is a side view of one embodiment of a first flow valve 566a configured in accordance with an embodiment of the disclosure and that can be used in the nozzle portion 508 of the injector 500 of FIG. 5A. In the embodiment shown in FIG. 5F, the first flow valve 566a has a generally cylindrical or tubular sleeve shape that includes the first or stationary end portion 568 opposite the second deformable or movable end portion 570. The first flow valve 566a can include an attachment collar or stop 569 extending around at least a portion of the stationary end portion 568. The attachment stop 569 is configured to help retain the stationary end portion 568 at the desired location on the ignition conductor 576 by at least partially engaging the insulative body 542 (FIG. 5A). According to additional features of the illustrated embodiment, the deformable or movable end portion 570 can include multiple spaced apart deformable finger portions or reeds 571. The reeds 571 are positioned in the nozzle portion 508 to at least partially overlap and contact the enlarged end portion 583 of the ignition insulator 582. Moreover, the reeds 571 are configured to deform or otherwise expand radially outwardly as illustrated by reeds 571 shown in broken lines. As such, the pressurized fuel and/or one or more actuators can deflect or deform one or more of the reeds 571 to allow the fuel to exit through normally covered and closed ports to provide fuel injection from the nozzle portion 508 of the injector 500. In one embodiment, the first flow valve 566a can be made from a metallic material, such as spring steel. In other embodiments, however, the first flow valve can be made from a suitable elastomer.

Figure 5G:
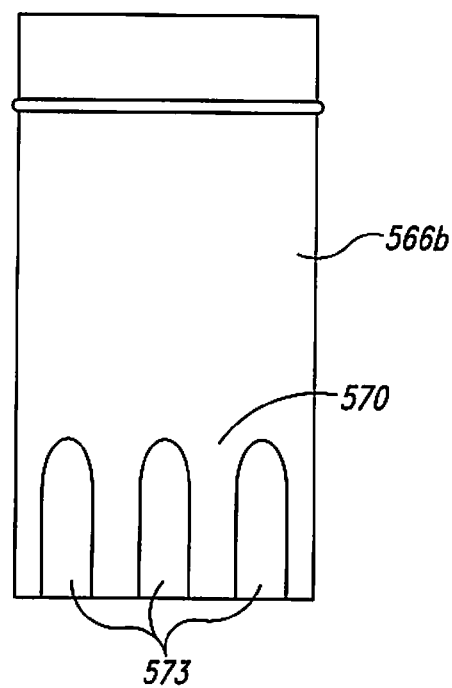

FIG. 5G is a side view of a second flow valve 566b configured in accordance with an embodiment of the disclosure and that can also be used in the nozzle portion 508 of the injector 500 (FIG. 5A). The second flow valve 566b is generally similar in structure and function to the first flow valve 566a shown in FIG. 5B. The second flow valve 566b, however, does not include separate deformable portions or reeds. Rather, the second flow valve 566b includes a second deformable or movable end portion 570 that has a generally cylindrical or tubular sleeve shape. The deformable end portion includes multiple spaced apart deformable sections 573 that are deposited on the second flow valve 566b. More specifically, in one embodiment the second flow valve 566b can be made from a suitable elastomer or other deformable material, and the deformable sections 573 can include discrete sections or segments of a deposited ferromagnetic material, such as a metallic coating. For example, the deformable sections 573 can include a metallic coating comprised of materials such as glass iron, an iron cobalt alloy (e.g., approximately 48% cobalt and 52% iron), iron chrome silicon, or other suitable iron alloys. As such, the deformable sections 573 can selectively deform the second end portion 570 of the second flow valve 566 in response to a magnetic force applied to the second flow valve 566.

Referring again to FIG. 5A, according to additional features of the illustrated embodiment, the injector 500 also includes a fuel exit passage 572 in the nozzle portion 508 positioned between the flow valve 566 and the ignition insulator 582. The fuel exit passage 572 is fluidly coupled to the second fuel flow section 564 via the ignition adapter 578. During operation, fuel is introduced into the fuel exit passage 572 and selectively dispersed from the nozzle portion 508 by actuation of the flow valve 566. More specifically, during operation fuel enters the fuel injector 500 into the base portion 506 via a first fuel fitting or inlet 538a. The first fuel inlet 538a introduces the fuel into the force generator 526, and the fuel exits the force generator 526 through multiple exit channels 540. The exit channels 540 are fluidly coupled to a fuel flow path or channel 524. In other embodiments, however, the base portion 506 can include an optional second fuel inlet 538b (shown in broken lines) to introduce the fuel directly into the fuel flow path 524, rather than through the force generator 526. The driver 520 includes multiple fuel flow channels or passages extending therethrough to allow the fuel to flow to an intermediate fuel flow volume 560. When the base valve head 556 rests against the valve seat 558, the base valve head seals the intermediate fuel flow volume 560.

As the valve operator assembly 525 moves the check valve or base valve 554 to the open position by lifting the base valve head 556 off of the valve seat 558, the pressurized fuel is introduced into the first fuel flow section 564. In certain embodiments, for example, the force generator 526 can actuate the driver 520 to move a first distance prior to contacting the stop 530 on the base valve 554. After gaining momentum and contacting the stop 530, the driver 520 can move a second distance along with the base valve 554 to open the base valve head 556. The pressurized fuel then flows from the first fuel flow section 564 through the second fuel flow section 566 and through the ignition adapter 578 into the fuel exit passage 572. In one embodiment, the pressure of the fuel in the fuel exit passage 572 is sufficient to at least partially radially expand or otherwise deform the movable end portion 570 of the flow valve 566 to allow the fuel to flow past the enlarged end portion 583 of the ignition insulator 580. The position of the flow valve 566 in the nozzle portion 508 accordingly prevents dribble or undesired trickle of fuel from the nozzle portion 508. In other embodiments, one or more actuators, drivers, selective biasing members, or other suitable force generators can at least partially radially expand or otherwise deform the movable end portion 570 of the flow valve 566. As the flow valve 566 selectively dispenses the fuel from the fuel exit passage 572, the fuel flows past the one or more ignition features 586 that can generate an ignition event to ignite and inject the fuel into the combustion chamber.

Figure 6:
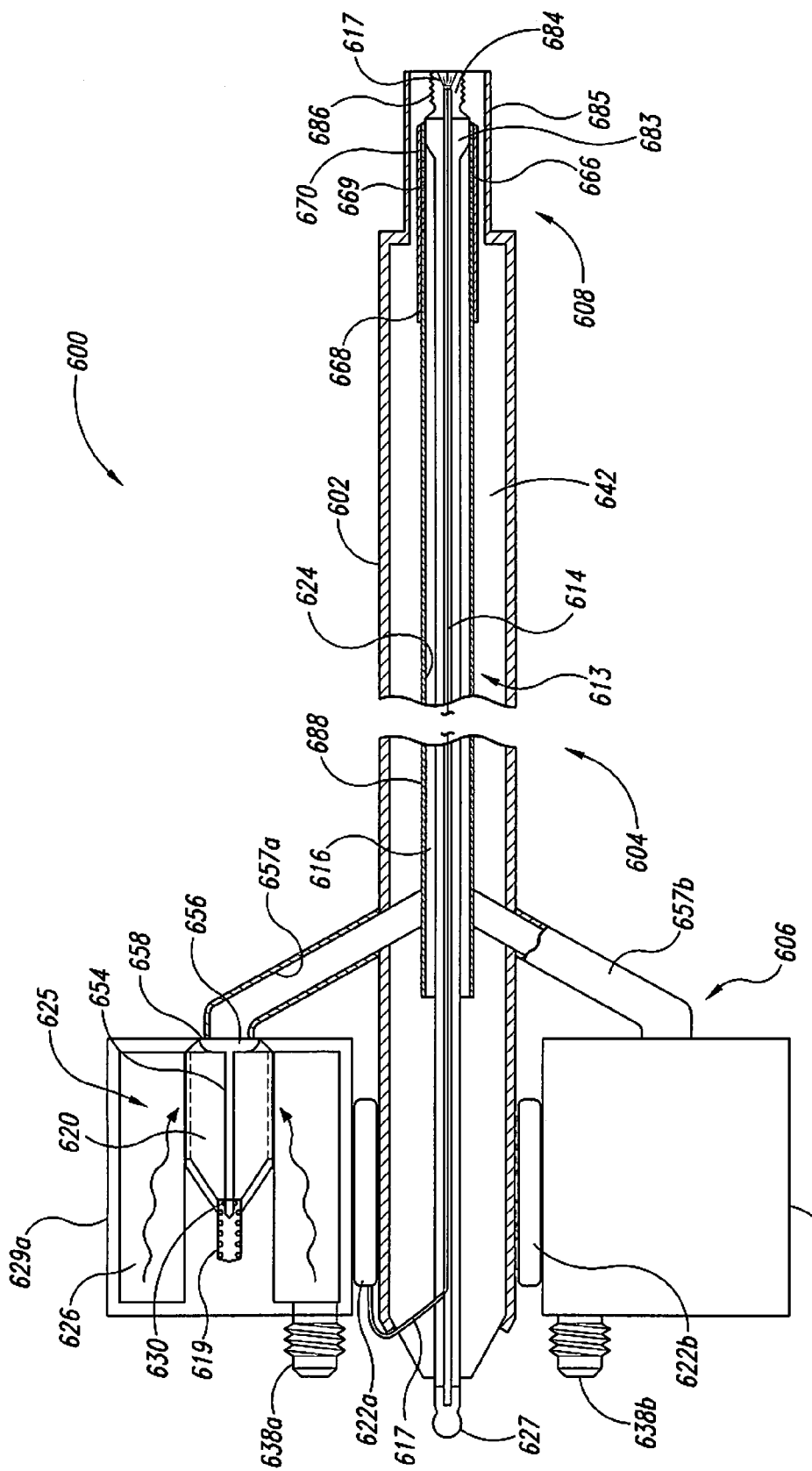
FIG. 6 is a cross-sectional side view of an injector configured in accordance with an additional embodiment of the disclosure.

FIG. 6 is a cross-sectional side view of an integrated injector/igniter 600 ("injector 600") configured in accordance with yet another embodiment of the disclosure. As explained in detail below, the injector 600 is particularly suited for large engine applications including, for example, gas turbines and various high-speed rotary combustion engines to operate with multiple fuel selections and/or multiburst applications. The injector 600 is also particularly suited for applications including relatively small injection ports as described above. The injector 600 illustrated in FIG. 6 includes several features that are generally similar in structure and function to the corresponding features of the injectors described above with reference to FIGS. 1-5G. For example, as shown in FIG. 6, the injector 600 includes a body 602 having a middle portion 604 extending between a first or base portion 606 and a second or nozzle portion 608. The nozzle portion 608 is configured to extend into an injection port in a cylinder head, such as a port having a diameter of approximately 8.4 millimeters (0.33 inch) or less, as found modern diesel injection ports for example. In other embodiments, however, the nozzle portion 608 can be configured for different sized injection ports.

The injector 600 further includes one or more base assemblies 629 (identified individually as a first base assembly 629a and a second base assembly 629b) configured to receive fuel into the base portion 606 of the injector 600 and selectively meter the fuel to the nozzle portion 608. More specifically, each base assembly 629 includes a valve operator assembly 625 configured to actuate a corresponding poppet or base valve 654. More specifically, the valve operator assembly 625 includes a force generator 626 (e.g., an electric, electromagnetic, magnetic, etc. force generator) that induces movement of a driver 620. The force generator 626 can also be operably coupled to a corresponding controller or processor 622 (identified individually a first controller 622a and a second controller 622b) to selectively pulse or actuate the force generator 626, for example, in response to one or more combustion chamber conditions or other engine parameters. The driver 620 engages a first check valve or base valve 654 at the base portion 606. More specifically, the base valve 654 includes one or more stops 630 that engage a biasing member 617 (e.g., a coil spring) positioned in a biasing member cavity 619 to bias the base valve towards a closed position as shown in FIG. 6 (e.g., in a direction toward the nozzle portion 608). The base valve stop 630 also engages the driver 620 such that the driver 620 moves the base valve 654 between the open and closed positions. The base valve 654 also includes a base valve head or sealing portion 656 that engages a corresponding valve seat 658 in the normally closed position as shown.

According to additional features of the illustrated embodiment, the injector 600 also includes a fuel inlet fitting 638 (identified individually as a first fuel inlet fitting 638a and a second fuel inlet fitting 638b) operably coupled to the corresponding base assembly 629 to introduce the fuel into the base assembly 629. In each base assembly 629, the fuel flows through the force generators 626 and the driver 620 to move past the base valve head 656 when the base valve is in the open position. The injector 600 further includes fuel connecting conduits 657 (identified individually as a first fuel connecting conduit 657a and a second fuel connecting conduit 657b) to transport the fuel from the base portion 606 to a fuel flow path or channel 624 extending through the middle portion 606 and the nozzle portion 608 of the body 602. The fuel flow channel 624 extends longitudinally adjacent to a core assembly 613, which extends through the body 602 from the base portion 606 at least partially into the nozzle portion 608. The core assembly 613 includes a core insulator 616 coaxially disposed over an ignition member or conductor 614. The core assembly 613 also includes a cylindrical or tubular enclosure member 688 that at least partially defines the fuel flow channel 624 with the ignition insulator 616. The core assembly 613 extends through an insulative body 642 of the body 402. The ignition conductor 614 is operably coupled to an ignition terminal 627 to supply an ignition voltage to the ignition electrode 684 having one or more ignition features 686. The ignition electrode 684 is a first electrode that can generate ignition events with a second electrode 685, which can be a conductive portion of the distal end of the nozzle portion 608. The ignition insulator 616 includes an enlarged end portion 683 having a greater cross-sectional dimension (e.g., a greater cross-sectional diameter) adjacent to the ignition electrode 684.

The enlarged end portion 683 of the ignition insulator 616 is configured to contact a flow control valve 666 carried by the nozzle portion 608. The flow valve 666 is a radially expanding valve that includes a first or stationary end portion 668 that is anchored, adhered, or otherwise coupled to the enclosure member 688 at a location downstream from the enlarged end portion 683 of the ignition insulator 616. For example, the first end portion 668 can be adhered to an outer surface of the enclosure member 688 with a suitable adhesive, thermopolymer, thermosetting compound, or other suitable adhesive. The flow valve 666 further includes a second deformable or movable end portion 670 opposite the stationary end portion 668. The movable end portion 670 contacts the enlarged end portion 683 of the ignition insulator 682 and is configured to at least partially radially expand, enlarge, or otherwise deform to allow fuel to exit the nozzle portion 608 of the injector 600. More specifically, the enclosure member 688 includes multiple fuel exit ports 669 adjacent to the movable end portion 670 of the flow valve 666.

During operation, fuel is introduced into the base assembly 629 via the fuel inlet fitting 638. The fuel flows through the force generator 626 and the driver 622 to arrive at the base valve head 656. When the valve operator assembly 625 moves the valve 654 to the open position to space the base valve head 656 apart from the valve seat 658, the fuel flows past the base valve head 656 and into the fuel connecting conduits 657. From fuel connecting conduits 657, the pressurized fuel flows into the fuel flow channel 624. In one embodiment, the pressure of the fuel in the fuel flow channel 624 is sufficient to at least partially radially expand or otherwise deform the movable end portion 670 of the flow valve 666 to allow the fuel to flow past the enlarged end portion 683 of the ignition insulator 680. In other embodiments, however, one or more actuators, drivers, selective biasing members, or other suitable force generators can at least partially radially expand or otherwise deform the movable end portion 670 of the flow valve 666. As the flow valve 666 selectively dispenses the fuel from the fuel exit ports 669, the fuel flows past the one or more ignition features 686 that can generate an ignition event to ignite and inject the fuel into the combustion chamber.

In certain embodiments, each base assembly 629, as well as other fuel flow controllers, can be configured to perform: 1) control of fuel flow by opening any of the valve assemblies, and 2) production of ionizing voltage upon completion of the valve opening function. To achieve both of these functions, in certain embodiments, for example, each force generator 626 can be a solenoid winding including a first or primary winding and a secondary winding. The secondary winding can include more turns than the first winding. Each winding can also include one or more layers of insulation (e.g., varnish or other suitable insulators), however the secondary winding may include more insulating layers than the first winding. The force generator 626 can also be electrically coupled to the conductor 614. By winding a force generator 626 or solenoid as a transformer with a primary winding and a secondary winding of many more turns, the primary can carry high current upon application of voltage to produce pull or otherwise induce movement of the driver 620 in of the plunger. Upon opening the relay to the primary winding, the driver 620 is released and a very high voltage will be produced by the secondary winding. The high voltage of the secondary winding can be applied to the plasma generation ignition event by providing the initial ionization after which relatively lower voltage discharge of a capacitor that has been charged with any suitable source (including energy harvested from the combustion chamber by photovoltaic, thermoelectric, and piezoelectric generators) continues to supply ionizing current and thrust of fuel into the combustion chamber.

Embodiments of the integrated injector igniters and, in particular, the flow valves disclosed in detail herein provide several advantages over conventional injectors and igniters. One advantage, for example, is that these flow valves have a radially compact shape and configuration that is particularly suited to be positioned in the nozzle portion of an injector used in modern diesel engines or other large engines with very limited size restrictions at the injection port. As noted above, for example, an injection port of a modern diesel engine often has an injection port diameter of about 8.4 mm (0.33 inch). As disclosed herein, these flow valves and associated actuating, insulating, and igniting components can operate within the limited available space. Moreover, positioning these valves at or proximate to the combustion chamber interface can at least partially prevent unwanted fuel dribble. In instances that heat gain tends to cause expansion of fuel to produce pressure between injection events, the embodiments similar to those shown in FIGS. 5B, 5C, 5D, and/or 5E may be used to prevent fuel dribble into the combustion chamber at undesirable times. Moreover, the embodiments of the flow valves disclosed herein are particularly suitable to resonate thereby achieving a very high rate of operation capability. Moreover, the embodiments disclosed herein are able to provide a rigid connection of a valve operator, such as a driver or plunger, with corresponding valve in both inwardly and outwardly opening configurations. In addition, these embodiments provide high temperature operating capabilities for applications in adiabatic engines and other applications that require relatively high admissions of heat from the combustion chamber. Furthermore, these embodiments can provide stationary delivery of ignition voltage to thereby allow delivery of very high voltage and consequent electrode gap currents to rapidly convert liquid fuels as they are injected into high speed blasts of ionized vapors and plasmas. These embodiments can also achieve much greater horsepower rates, such as 10,000 HP per injector for selected gas turbine and large piston engine applications that can accommodate extremely rapid completion of combustion to eliminate the need/use of precombustion chambers and combustion cans. Moreover, these embodiments can also provide for the center ignition or electrode assembly to integrate components and provide composited functions including instrumentation by fibers 617 such as optical filaments, electrical current and voltage conduction to thereby serve as the stationary valve seat for normally closed valve. What's more, these embodiments can have a significantly high dielectric strength capable of 50 KV to 150 KV of ionization voltage at current pulses of 1000 or more instantaneous amps through the ignition electrodes as shown.

In addition, several of the embodiments described in detail above of the fuel injectors may be used in engines that are configured to combust a hydrogen-characterized fuel (e.g., ammonia) or other fuels with low energy density (e.g., carbon monoxide and hydrogen), which may be 3000 times less energy dense than diesel. For example, engines of oceanic tankers that transport liquid methane, propane, ammonia, methanol, and/or other commodities can have operating cost savings when they are equipped with several embodiments of the injectors disclosed herein. In one embodiment, for example, the carried commodity may be reformed using waste heat from the engines as follow:

$$2NH_3 \longrightarrow 3H_2 + N_2$$

$$CH_3OH \longrightarrow CO + H_2$$

This is accomplished by converting the propulsion engines (including heat engines such as compression-ignition diesel type engines, various rotary combustion engines, and gas turbines) to operate on fuels that may be reformed from such commodities by endothermic reactions in which the heat rejected by such heat engines is utilized to drive such reactions. In other embodiments, the injector may also be used in power plants, chemical plants, and/or other suitable locations with heat producing engines.

In these types of embodiments, thermo-chemical regeneration using heat rejected by an engine provides attractive fuel savings because the hydrogen characterized fuels that are produced yield 15 to 30% more energy upon combustion than their feedstock. In addition, the embodiments of the injectors disclosed herein can allow hydrogen characterized fuels to combust up to 12 times faster than diesel or bunker fuels, thus greatly improving engine efficiency and eliminating particulates in the exhaust of the engine.

From the foregoing, it will be appreciated that specific embodiments of the disclosure have been described herein for purposes of illustration, but that various modifications may be made without deviating from the spirit and scope of the invention. For example, the dielectric strength of the insulators disclosed herein may be altered or varied to include alternative materials and processing means. The actuators and drivers may be varied depending on fuel and/or the use of the corresponding injectors. Moreover, components of the injector may be varied including for example, the electrodes, the optics, the actuators, the valves, and the nozzles or the bodies may be made from alternative materials or may include alternative configurations than those shown and described and still be within the spirit of the disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list. In addition, the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. An injector for introducing and igniting fuel at an interface with a combustion chamber, the injector comprising:
an injector body including—
a base portion configured to receive fuel into the injector body;
a nozzle portion opposite the base portion, wherein the nozzle portion is configured to be positioned proximate to the combustion chamber for injecting fuel in the combustion chamber;
a body insulator extending through at least a portion of the body; and
a valve seat carried by the body insulator, wherein the valve seat is positioned at or proximate to the nozzle portion;
a fuel flow path extending through the body; and
a core assembly extending through the body coaxially with at least a portion of the fuel flow path, the core assembly including—
an ignition rod extending from the base portion to the nozzle portion;
an ignition insulator coaxially disposed over the ignition rod, the ignition insulator extending from the base portion at least partially into the nozzle portion; and
a valve coaxially disposed over the ignition insulator, wherein the valve includes a sealing head adjacent to the valve seat, and wherein the valve moves along the ignition insulator between an open position in which the sealing head is spaced apart from the valve seat to allow fuel to exit the fuel flow path, and a closed position in which the sealing head at least partially contacts the valve seat to close the fuel flow path.

2. The injector of claim 1 wherein the nozzle portion has a diameter of approximately 0.33 inch or less.

3. The injector of claim 1 wherein the nozzle portion has a length of approximately 12 inches or more.

4. The injector of claim 1, further comprising a valve operator assembly carried by the base portion, the valve operator assembly comprising:
a driver surrounding at least a portion of the valve and movable between a first position and a second position, wherein when the driver is in the first position the valve is retained in the closed position, and when the driver moves to the second position the driver engages and moves the valve to the open position;
a force generator configured to actuate the driver to move between the first and second positions; and
a controller configured to selectively activate the force generator.

5. The injector of claim 4, further comprising a fuel inlet fluidly coupled to the force generator to introduce fuel into the base portion via the force generator.

6. The injector of claim 1 wherein the valve includes a first end portion opposite the sealing head, and wherein the injector further comprises a driver movably positioned in the base portion between a first position and a second position, wherein when the driver is in the first position the valve is retained in the open position, and when the driver moves to the second position the driver engages the first end portion of the valve and moves the valve to the open position.

7. The injector of claim 6 wherein the first end portion of the valve includes a stop, and wherein the driver contacts the stop when the driver engages the first end portion of the valve.

8. The injector of claim 6 wherein the driver moves a predetermined distance before engaging the first end portion of the valve as the driver moves toward the second position.

9. The injector of claim 1, further comprising one or more optical fibers extending through the ignition rod, wherein the one or more optical fibers are configured to transmit combustion chamber data from the combustion chamber to a controller operably coupled to the injector.

10. The injector of claim 1, wherein the ignition rod includes one or more ignition features positioned in the nozzle portion between the sealing head of the valve and the combustion chamber, and wherein the one or more ignition features are configured to generate an ignition event to ignite fuel exiting the nozzle portion.

11. The injector of claim 10 wherein the one or more ignition features are spirally wound around at least a portion of the ignition rod.

12. The injector of claim 1 wherein the sealing head of the valve is spaced apart from the interface with the combustion chamber by a distance of at least approximately 12 inches or more.

13. The injector of claim 1 wherein the sealing head of the valve is configured to be positioned in the nozzle portion adjacent to the interface with the combustion chamber.

14. The injector of claim 1, further comprising a controller for:
selectively controlling the movement of the valve with reference to the ignition insulator; and
selectively controlling an ignition event generated by the ignition rod.

15. The injector of claim 1 wherein the valve has a first length, the ignition insulator has a second length greater than the first length, and the ignition rod has a third length greater than the second length.

16. The injector of claim 1 wherein the valve is an outwardly opening valve moving in a direction toward the combustion chamber when the valve moves from the closed position to the open position.

17. The injector of claim 1 wherein the valve is an inwardly opening valve moving in a direction away from the combustion chamber when the valve moves from the closed position to the open position.

18. The injector of claim 1, wherein the fuel flow path extends through the body between the valve and the body insulator.

19. An injector for introducing fuel into a combustion chamber, the injector comprising:
a body having a first end portion opposite a second end portion, wherein the second end portion is configured to be positioned adjacent to an interface of the combustion chamber and the first end portion is configured to be spaced apart from the combustion chamber;
an ignition conductor extending through the body from the first end portion to the second end portion, wherein the ignition conductor is configured to transmit ignition energy from the first end portion to the second end portion and generate an ignition event proximate to the interface of the combustion chamber;
an insulator extending longitudinally along the ignition conductor and surrounding at least a portion of the ignition conductor;
a valve extending longitudinally along the insulator from the first end portion to the second end portion, wherein the valve includes a sealing end portion, and wherein the valve is movable along the insulator between an open position and a closed position; and
a valve seat at or proximate to the second end portion of the body, wherein when the valve is in the open position the sealing end portion is spaced apart from the valve seat and when the valve is in the closed position the sealing end portion contacts at least a portion of the valve seat.

20. The injector of claim 19 wherein the insulator is a first insulator and wherein the injector further comprises:
a second insulator extending longitudinally along the body and spaced radially apart from the valve; and
an annular fuel flow passage extending from the first end portion to the second end portion between the second insulator and the valve.

21. The injector of claim 19, further comprising a fuel flow passage coaxially disposed around and surrounding the valve.

22. The injector of claim 19 wherein the sealing end portion of the valve comprises an enlarged end portion of the valve having a first diameter that is greater than a second diameter of the valve.

23. The injector of claim 19, further comprising one or more optical sensors extending from the first end portion to the second end portion, wherein the one or more optical fibers are configured to detect or transmit combustion chamber data from the combustion chamber.

24. The injector of claim 23 wherein the one or more optical sensors extend longitudinally through the ignition conductor.

25. The injector of claim 19 wherein the valve further comprises a base portion opposite the sealing end portion, the injector further comprising:
an actuator positioned in the first end portion, wherein the actuator is movable between a first position and a second position, wherein when the actuator moves from the first position toward the second position the actuator contacts the base portion of the valve and moves the valve from the closed position toward the open position; and
a force generator positioned in the first end portion adjacent to the actuator, wherein the force generator is configured to activate the actuator to move the actuator between the first and second positions.

26. The injector of claim 19 wherein the valve extends at least partially through the second end portion of the body, and the sealing end portion of the valve is positioned adjacent to the interface of the combustion chamber.

27. The injector of claim 19, further comprising one or more ignition features carried by the ignition conductor, wherein the one or more ignition features are positioned between the sealing end portion of the valve and the interface of the combustion chamber, and wherein the one or more ignition features are configured to generate an ignition event to ignite fuel that passes beyond the sealing end portion of the valve.

28. The injector of claim 19 wherein the second end portion of the body has a diameter of approximately 0.33 inch or less.

29. An injector for introducing fuel into a combustion chamber, the injector comprising:
a nozzle portion configured to be positioned adjacent to an interface with the combustion chamber;
a base portion opposite the nozzle portion and configured to be spaced apart from the nozzle portion;
an ignition conductor at least partially extending through the nozzle portion;
an ignition insulator coaxially disposed over at least a portion of the ignition conductor; and
a valve positioned in the nozzle portion and coaxially disposed over at least a portion of the ignition insulator and radially spaced apart from at least a portion of the ignition insulator, wherein the valve includes—
a first end portion that remains generally stationary with reference to the ignition insulator; and
a second sealing end portion positioned between the first end portion and the combustion chamber, wherein the second sealing end portion is at least partially deformable in a direction radially away from the ignition insulator to move from a closed position to an open position to inject fuel from the nozzle portion into the combustion chamber.

30. The injector of claim 29 wherein the valve is a first valve, and wherein the injector further comprises a second valve positioned in the base portion, wherein the second valve moves in a direction generally parallel to a longitudinal axis of the injector from a closed position and an open position to allow the fuel to flow from the base portion to the nozzle portion.

31. The injector of claim 30 wherein the second valve is independently movable from the first valve.

32. The injector of claim 29 further comprising a driver movably positioned in the base portion coaxially surrounding at least a portion of the second valve, wherein the driver is movable between a first position and a second position, wherein as the driver moves from the first position toward the second position the driver engages the second valve and moves the second valve from the closed position toward the open position.

33. The injector of claim 29 wherein the ignition conductor is a first ignition conductor, and wherein the injector further comprises a second ignition conductor electrically coupled to the first ignition conductor, wherein the second ignition conductor extends from the nozzle portion toward the base portion and at least partially encases a fuel flow passage extending longitudinally through the injector.

34. The injector of claim 29, further comprising an ignition terminal at the base portion, wherein the ignition terminal is configured to be operably coupled to an ignition energy source, and wherein the ignition conductor extends from the ignition terminal in the base portion to the nozzle portion.

35. The injector of claim 34 wherein the ignition insulator is coaxially disposed over the ignition conductor and extends from the base portion at least partially into the nozzle portion.

36. The injector of claim 29 wherein the ignition insulator includes an enlarged end portion positioned adjacent to the interface with the combustion chamber, and wherein the second sealing end portion of the valve is positioned adjacent to the enlarged end portion of the ignition insulator.

* * * * *